US008221214B2

(12) United States Patent
Nicely

(10) Patent No.: US 8,221,214 B2
(45) Date of Patent: Jul. 17, 2012

(54) ROTOR-BASED GAMING DEVICE HAVING A SECONDARY AWARD SYSTEM

(75) Inventor: Mark C. Nicely, Daly City, CA (US)

(73) Assignee: IGT, Reno, NV (US)

( * ) Notice: Subject to any disclaimer, the term of this patent is extended or adjusted under 35 U.S.C. 154(b) by 1328 days.

(21) Appl. No.: 11/609,173

(22) Filed: Dec. 11, 2006

(65) Prior Publication Data

US 2007/0135204 A1 Jun. 14, 2007

Related U.S. Application Data

(60) Provisional application No. 60/748,848, filed on Dec. 9, 2005.

(51) Int. Cl.
*A63F 9/24* (2006.01)
*A63F 13/00* (2006.01)
*G06F 17/00* (2006.01)
*G06F 19/00* (2011.01)

(52) U.S. Cl. ................ 463/20; 463/16; 463/17; 463/25; 273/274

(58) Field of Classification Search .................... 463/16, 463/17, 20, 25; 273/274
See application file for complete search history.

(56) References Cited

U.S. PATENT DOCUMENTS 1,578,412 A 3/1926 Ewig
3,628,259 A 12/1971 Kahn
3,819,186 A 6/1974 Hinterstocker
4,077,631 A 3/1978 Tela, Sr.
4,156,976 A 6/1979 Mikun
4,198,052 A 4/1980 Gauselmann
4,222,561 A 9/1980 Whitten
4,260,159 A 4/1981 Hoffman
4,337,945 A 7/1982 Levy
4,448,419 A 5/1984 Telnaes
4,621,814 A 11/1986 Stepan et al.
4,624,459 A 11/1986 Kaufman
4,669,731 A 6/1987 Clarke
4,679,143 A 7/1987 Hagiwara
4,695,053 A 9/1987 Vazquez, Jr. et al.
4,732,386 A 3/1988 Rayfiel
(Continued)

FOREIGN PATENT DOCUMENTS

AU B-13331/88 9/1988
(Continued)

OTHER PUBLICATIONS

3RV—Jackpot Party Advertisement written by WMS Gaming, Inc., published Aug. 8, 2002.

(Continued)

*Primary Examiner* — Peter DungBa Vo
*Assistant Examiner* — Wei Li
(74) *Attorney, Agent, or Firm* — Neal, Gerber & Eisenberg LLP

(57) ABSTRACT

A game system including a plurality of symbols, a rotor and an award amount. The plurality of symbols include at least one secondary award group of the symbols. A wager is placeable on the secondary award group. The rotor displays the symbols and a plurality of ball landings adjacent to the symbols. A plurality of the symbols are indicatable after multiple spins of the rotor. The game system is operable to provide a secondary award based on the indication of one or more symbols within the secondary award group.

18 Claims, 20 Drawing Sheets

U.S. PATENT DOCUMENTS 4,743,022 A 5/1988 Wod
4,805,907 A 2/1989 Hagiwara
4,836,546 A 6/1989 DiRe et al.
4,837,728 A 6/1989 Barrie et al.
4,838,552 A 6/1989 Hagiwara
4,840,375 A 6/1989 Lawlor et al.
4,880,237 A 11/1989 Kishishita
4,906,005 A 3/1990 Manabe
4,941,665 A 7/1990 Klamer
4,989,878 A 2/1991 Davies
4,991,848 A 2/1991 Greenwood et al.
5,011,159 A 4/1991 Fortunato et al.
5,019,973 A 5/1991 Wilcox et al.
5,046,735 A 9/1991 Hamano et al.
5,083,785 A 1/1992 Okada
5,085,436 A 2/1992 Bennett
5,088,737 A 2/1992 Frank et al.
5,100,137 A 3/1992 Fulton
5,102,134 A 4/1992 Smyth
5,102,135 A 4/1992 Addiechi
5,116,055 A 5/1992 Tracy
5,123,649 A 6/1992 Tiberio
5,131,655 A 7/1992 Ugawa
5,152,529 A 10/1992 Okada
5,167,413 A 12/1992 Fulton
5,184,821 A 2/1993 Korenek
5,197,736 A 3/1993 Backus et al.
5,224,706 A 7/1993 Bridgeman et al.
5,251,897 A 10/1993 Fulton
5,259,616 A 11/1993 Bergmann
5,294,120 A 3/1994 Schultz
5,294,128 A 3/1994 Marquez
5,308,065 A 5/1994 Bridgeman et al.
5,332,228 A 7/1994 Schultz
5,342,047 A 8/1994 Heidel et al.
5,344,144 A 9/1994 Canon
5,356,140 A 10/1994 Dabrowski et al.
5,375,830 A 12/1994 Takemoto et al.
5,377,973 A 1/1995 Jones et al.
5,380,008 A 1/1995 Mathis et al.
5,393,057 A 2/1995 Marnell, II
5,393,061 A 2/1995 Manship et al.
5,395,111 A 3/1995 Inoue
5,397,125 A 3/1995 Adams
5,401,023 A 3/1995 Wood
5,405,143 A 4/1995 Takemoto et al.
5,407,200 A 4/1995 Zalabak
5,415,404 A 5/1995 Joshi et al.
5,423,539 A 6/1995 Nagao
5,431,408 A 7/1995 Adams
5,437,452 A 8/1995 Graf et al.
5,449,173 A 9/1995 Thomas et al.
5,456,465 A 10/1995 Durham
5,489,101 A 2/1996 Moody
5,509,655 A 4/1996 Ugawa
5,511,781 A 4/1996 Wood et al.
5,531,448 A 7/1996 Moody
5,540,442 A 7/1996 Orselli et al.
5,542,669 A 8/1996 Charron et al.
5,553,851 A 9/1996 Malavazos et al.
5,560,603 A 10/1996 Seelig et al.
5,564,700 A 10/1996 Celona
5,569,084 A 10/1996 Nicastro et al.
5,570,885 A 11/1996 Ornstein
5,580,055 A 12/1996 Hagiwara
5,584,486 A 12/1996 Franklin
5,584,763 A 12/1996 Kelly et al.
5,584,764 A 12/1996 Inoue
5,588,650 A 12/1996 Eman et al.
5,593,161 A 1/1997 Boylan et al.
5,611,535 A 3/1997 Tiberio
5,630,585 A 5/1997 Takemoto et al.
5,636,837 A 6/1997 Takemoto et al.
5,636,838 A 6/1997 Caro
5,639,089 A 6/1997 Matsumoto et al.
5,645,485 A 7/1997 Clapper, Jr.
5,645,486 A 7/1997 Nagao et al.
5,647,798 A 7/1997 Falciglia
5,655,961 A 8/1997 Acres et al.
5,657,993 A 8/1997 Merlino et al.
5,678,001 A 10/1997 Nagel et al.
5,695,402 A 12/1997 Stupak
5,702,304 A 12/1997 Acres et al.
5,707,285 A 1/1998 Place et al.
5,711,715 A 1/1998 Ringo et al.
5,718,431 A 2/1998 Ornstein
5,720,662 A 2/1998 Holmes, Jr. et al.
D392,340 S 3/1998 DeSimone
5,722,891 A 3/1998 Inoue
5,725,428 A 3/1998 Achmuller
5,732,950 A 3/1998 Moody
5,743,798 A 4/1998 Adams et al.
5,755,440 A 5/1998 Sher
5,766,074 A 6/1998 Cannon et al.
5,769,716 A 6/1998 Saffari et al.
5,770,533 A 6/1998 Franchi
5,772,506 A 6/1998 Marks et al.
5,772,509 A 6/1998 Weiss
5,775,692 A 7/1998 Watts et al.
5,788,573 A 8/1998 Baerlocher et al.
5,791,987 A 8/1998 Chen et al.
5,807,172 A 9/1998 Piechowiak
5,810,361 A 9/1998 Kadlic
5,816,916 A 10/1998 Moody
5,816,918 A 10/1998 Kelly et al.
5,817,172 A 10/1998 Yamada et al.
5,820,460 A 10/1998 Fulton
5,823,873 A 10/1998 Moody
5,823,874 A 10/1998 Adams
5,833,537 A 11/1998 Barrie
5,833,538 A 11/1998 Weiss
5,836,583 A 11/1998 Towers
5,848,932 A 12/1998 Adams
5,855,514 A 1/1999 Kamille
5,857,909 A 1/1999 Rubin
5,868,619 A 2/1999 Wood et al.
5,876,284 A 3/1999 Acres et al.
5,882,105 A 3/1999 Barlow
5,882,258 A 3/1999 Kelly et al.
5,882,261 A 3/1999 Adams
5,890,962 A 4/1999 Takemoto
5,902,184 A 5/1999 Bennett
5,910,048 A 6/1999 Feinberg
5,911,418 A 6/1999 Adams
5,918,880 A 7/1999 Voigt, IV et al.
5,934,672 A 8/1999 Sines et al.
5,934,999 A 8/1999 Valdez
5,935,002 A 8/1999 Falciglia
5,947,820 A 9/1999 Morro et al.
5,951,397 A 9/1999 Dickinson
5,954,335 A 9/1999 Moody
5,964,463 A 10/1999 Moore, Jr.
5,967,893 A 10/1999 Lawrence et al.
5,971,849 A 10/1999 Falciglia
D416,054 S 11/1999 McGahn et al.
5,976,016 A 11/1999 Moody et al.
5,980,384 A 11/1999 Barrie
5,984,310 A 11/1999 English
5,984,781 A 11/1999 Sunaga
5,984,782 A 11/1999 Inoue
5,988,638 A 11/1999 Rodesch et al.
5,993,316 A 11/1999 Coyle et al.
5,997,401 A 12/1999 Crawford
6,003,867 A 12/1999 Rodesch et al.
6,004,207 A 12/1999 Wilson, Jr. et al.
6,007,066 A 12/1999 Moody
6,007,424 A 12/1999 Evers et al.
6,012,720 A 1/2000 Webb
6,012,981 A 1/2000 Fujioka et al.
6,012,982 A 1/2000 Piechowiak et al.
6,012,983 A 1/2000 Walker et al.
6,032,955 A 3/2000 Luciano et al.
6,033,307 A 3/2000 Vancura
6,039,649 A 3/2000 Schulze
6,047,963 A 4/2000 Pierce et al.
6,053,813 A 4/2000 Mathis
6,053,823 A 4/2000 Mathews

| | | | |
|---|---|---|---|
| 6,056,642 | A | 5/2000 | Bennett |
| 6,059,289 | A | 5/2000 | Vancura |
| 6,059,658 | A | 5/2000 | Mangano et al. |
| 6,059,659 | A | 5/2000 | Busch et al. |
| 6,062,980 | A | 5/2000 | Luciano |
| 6,062,981 | A | 5/2000 | Luciano, Jr. |
| 6,071,192 | A | 6/2000 | Weiss |
| 6,083,105 | A | 7/2000 | Ronin et al. |
| 6,089,977 | A | 7/2000 | Bennett |
| 6,089,978 | A | 7/2000 | Adams |
| 6,089,980 | A | 7/2000 | Gauselmann |
| 6,093,101 | A | 7/2000 | Mourad |
| 6,093,102 | A | 7/2000 | Bennett |
| 6,098,985 | A | 8/2000 | Moody |
| 6,102,400 | A | 8/2000 | Scott et al. |
| 6,102,402 | A | 8/2000 | Scott et al. |
| 6,102,798 | A | 8/2000 | Bennett |
| 6,105,962 | A | 8/2000 | Malavazos et al. |
| 6,110,041 | A | 8/2000 | Walker et al. |
| 6,113,098 | A | 9/2000 | Adams |
| 6,120,031 | A | 9/2000 | Adams |
| 6,120,378 | A | 9/2000 | Moody et al. |
| 6,126,165 | A | 10/2000 | Sakamoto |
| 6,126,541 | A | 10/2000 | Fuchs |
| 6,126,542 | A | 10/2000 | Fier |
| 6,129,632 | A | 10/2000 | Luciano |
| 6,132,311 | A | 10/2000 | Williams |
| 6,135,884 | A | 10/2000 | Hedrick et al. |
| 6,142,872 | A | 11/2000 | Walker et al. |
| 6,142,873 | A | 11/2000 | Weiss et al. |
| 6,142,874 | A | 11/2000 | Kodachi et al. |
| 6,142,875 | A | 11/2000 | Kodachi et al. |
| 6,149,521 | A | 11/2000 | Sanduski |
| 6,155,925 | A | 12/2000 | Giobbi et al. |
| 6,158,741 | A | 12/2000 | Koelling |
| 6,159,095 | A | 12/2000 | Frohm et al. |
| 6,159,096 | A | 12/2000 | Yoseloff |
| 6,159,097 | A | 12/2000 | Gura |
| 6,159,098 | A | 12/2000 | Slomiany et al. |
| 6,162,121 | A | 12/2000 | Morro et al. |
| 6,168,520 | B1 | 1/2001 | Baerlocher et al. |
| 6,168,522 | B1 | 1/2001 | Walker et al. |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,179,711 | B1 | 1/2001 | Yoseloff |
| 6,186,894 | B1 | 2/2001 | Mayeroff |
| 6,190,254 | B1 | 2/2001 | Bennett |
| 6,190,255 | B1 | 2/2001 | Thomas et al. |
| 6,193,606 | B1 | 2/2001 | Walker et al. |
| 6,196,547 | B1 | 3/2001 | Pascal et al. |
| 6,203,009 | B1 | 3/2001 | Sines et al. |
| 6,203,010 | B1 | 3/2001 | Jorasch et al. |
| 6,203,429 | B1 | 3/2001 | Demar et al. |
| 6,203,430 | B1 | 3/2001 | Walker et al. |
| 6,209,869 | B1 | 4/2001 | Mathews |
| 6,210,277 | B1 | 4/2001 | Stefan |
| 6,217,022 | B1 | 4/2001 | Astaneha |
| 6,217,448 | B1 | 4/2001 | Olsen |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,542 | B1 | 5/2001 | Cosmi |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,238,287 | B1 | 5/2001 | Komori et al. |
| 6,238,288 | B1 | 5/2001 | Walker et al. |
| 6,244,957 | B1 | 6/2001 | Walker et al. |
| 6,251,013 | B1 | 6/2001 | Bennett |
| 6,254,482 | B1 | 7/2001 | Walker et al. |
| 6,254,483 | B1 | 7/2001 | Acres |
| 6,257,981 | B1 | 7/2001 | Acres et al. |
| 6,261,178 | B1 | 7/2001 | Bennett |
| 6,264,200 | B1 | 7/2001 | Smith |
| 6,270,409 | B1 | 8/2001 | Shuster |
| 6,270,411 | B1 | 8/2001 | Gura et al. |
| 6,270,412 | B1 | 8/2001 | Crawford et al. |
| 6,290,600 | B1 | 9/2001 | Glasson |
| 6,290,603 | B1 | 9/2001 | Luciano, Jr. |
| 6,299,165 | B1 | 10/2001 | Nagano |
| 6,299,170 | B1 | 10/2001 | Yoseloff |
| 6,302,398 | B1 | 10/2001 | Vecchio |
| 6,302,790 | B1 | 10/2001 | Brossard |
| 6,302,791 | B1 | 10/2001 | Frohm et al. |
| 6,305,686 | B1 | 10/2001 | Perrie et al. |
| 6,309,299 | B1 | 10/2001 | Weiss |
| 6,311,976 | B1 | 11/2001 | Yoseloff et al. |
| 6,312,331 | B1 | 11/2001 | Tamaki |
| 6,312,334 | B1 | 11/2001 | Yoseloff |
| 6,315,660 | B1 | 11/2001 | DeMar et al. |
| 6,315,662 | B1 | 11/2001 | Jorasch et al. |
| 6,315,663 | B1 | 11/2001 | Sakamoto |
| 6,319,122 | B1 | 11/2001 | Packes, Jr. et al. |
| 6,319,124 | B1 | 11/2001 | Baerlocher et al. |
| 6,322,078 | B1 | 11/2001 | Adams |
| 6,336,860 | B1 | 1/2002 | Webb |
| 6,336,862 | B1 | 1/2002 | Byrne |
| 6,336,863 | B1 | 1/2002 | Baerlocher et al. |
| 6,340,158 | B2 | 1/2002 | Pierce et al. |
| 6,352,260 | B1 | 3/2002 | Santiago |
| 6,358,144 | B1 | 3/2002 | Kaddlic et al. |
| 6,358,147 | B1 | 3/2002 | Jaffe et al. |
| 6,364,314 | B1 | 4/2002 | Canterbury |
| 6,364,766 | B1 | 4/2002 | Anderson et al. |
| 6,364,768 | B1 | 4/2002 | Acres et al. |
| 6,368,214 | B1 | 4/2002 | Luciano |
| 6,371,853 | B1 | 4/2002 | Borta |
| 6,375,569 | B1 | 4/2002 | Acres |
| 6,375,570 | B1 | 4/2002 | Poole |
| 6,390,470 | B1 | 5/2002 | Huang |
| 6,394,902 | B1 | 5/2002 | Glavich et al. |
| 6,398,218 | B1 | 6/2002 | Vancura |
| 6,398,220 | B1 | 6/2002 | Inoue |
| 6,398,644 | B1 | 6/2002 | Perrie et al. |
| 6,413,162 | B1 | 7/2002 | Baerlocher et al. |
| 6,413,163 | B1 | 7/2002 | Yamauchi et al. |
| 6,419,579 | B1 | 7/2002 | Bennett |
| 6,428,412 | B1 | 8/2002 | Anderson et al. |
| 6,435,511 | B1 | 8/2002 | Vacura et al. |
| 6,435,968 | B1 | 8/2002 | Torango |
| 6,439,943 | B1 | 8/2002 | Aoki et al. |
| 6,439,993 | B1 | 8/2002 | O'Halloran |
| 6,439,995 | B1 | 8/2002 | Hughs-Baird et al. |
| 6,443,452 | B1 | 9/2002 | Brune |
| 6,443,456 | B1 | 9/2002 | Gajor |
| 6,446,365 | B1 | 9/2002 | Sullivan et al. |
| 6,450,884 | B1 | 9/2002 | Seelig et al. |
| 6,454,266 | B1 | 9/2002 | Breeding et al. |
| 6,461,241 | B1 | 10/2002 | Webb et al. |
| 6,467,770 | B1 | 10/2002 | Matosevic |
| 6,468,156 | B1 | 10/2002 | Hughs-Baird et al. |
| 6,471,208 | B2 | 10/2002 | Yoseloff et al. |
| 6,481,713 | B2 | 11/2002 | Perrie et al. |
| 6,491,584 | B2 | 12/2002 | Graham et al. |
| 6,494,454 | B2 | 12/2002 | Adams |
| 6,497,409 | B2 | 12/2002 | Mathews |
| 6,517,432 | B1 | 2/2003 | Jaffe |
| 6,520,503 | B1 | 2/2003 | Porto |
| 6,520,854 | B1 | 2/2003 | McNally |
| 6,537,150 | B1 | 3/2003 | Luciano et al. |
| 6,537,152 | B2 | 3/2003 | Seelig et al. |
| 6,547,663 | B1 | 4/2003 | Delott et al. |
| 6,551,187 | B1 | 4/2003 | Jaffe |
| 6,554,283 | B2 | 4/2003 | Vancura et al. |
| 6,561,512 | B2 | 5/2003 | Luciano et al. |
| 6,561,904 | B2 | 5/2003 | Locke et al. |
| 6,565,436 | B1 | 5/2003 | Baerlocher |
| 6,569,013 | B1 | 5/2003 | Taylor |
| 6,575,834 | B1 | 6/2003 | Lindo |
| 6,599,185 | B1 | 7/2003 | Kaminkow et al. |
| 6,599,193 | B2 | 7/2003 | Baerlocher et al. |
| 6,602,136 | B1 | 8/2003 | Baerlocher et al. |
| 6,602,137 | B2 | 8/2003 | Kaminkow et al. |

| | | | | |
|---|---|---|---|---|
| 6,604,740 | B1 | 8/2003 | Singer et al. | |
| 6,609,969 | B1 | 8/2003 | Luciano et al. | |
| 6,609,970 | B1 | 8/2003 | Luciano, Jr. | |
| 6,612,927 | B1 | 9/2003 | Slomiany et al. | |
| 6,616,142 | B2 | 9/2003 | Adams | |
| 6,632,139 | B1 | 10/2003 | Baerlocher | |
| 6,632,140 | B2 | 10/2003 | Berman et al. | |
| 6,634,942 | B2 | 10/2003 | Walker et al. | |
| 6,634,945 | B2 | 10/2003 | Glavich et al. | |
| 6,652,378 | B2 | 11/2003 | Cannon et al. | |
| 6,656,043 | B2 | 12/2003 | Seelig et al. | |
| 6,659,461 | B2 * | 12/2003 | Yoseloff et al. | 273/274 |
| 6,659,462 | B1 | 12/2003 | Scott | |
| 6,663,106 | B1 | 12/2003 | Cosmi | |
| 6,666,766 | B2 | 12/2003 | Baerlocher et al. | |
| 6,682,073 | B2 | 1/2004 | Bryant et al. | |
| 6,695,696 | B1 | 2/2004 | Kaminkow | |
| 6,712,693 | B1 | 3/2004 | Hettinger | |
| 6,712,694 | B1 | 3/2004 | Nordman | |
| 6,712,695 | B2 | 3/2004 | Mothwurf et al. | |
| 6,726,563 | B1 | 4/2004 | Baerlocher et al. | |
| 6,733,389 | B2 | 5/2004 | Webb et al. | |
| 6,739,970 | B2 | 5/2004 | Luciano | |
| 6,743,102 | B1 | 6/2004 | Fiechter et al. | |
| 6,758,167 | B1 | 7/2004 | Edelinski | |
| 6,758,749 | B2 | 7/2004 | Krintzman | |
| 6,764,396 | B2 | 7/2004 | Seelig et al. | |
| 6,776,711 | B1 | 8/2004 | Baerlocher | |
| 6,780,105 | B1 | 8/2004 | Kaminkow | |
| 6,786,824 | B2 | 9/2004 | Cannon | |
| 6,802,778 | B1 | 10/2004 | Lemay et al. | |
| 6,805,349 | B2 | 10/2004 | Baerlocher et al. | |
| 6,811,483 | B1 | 11/2004 | Webb et al. | |
| 6,857,957 | B2 | 2/2005 | Marks et al. | |
| 6,869,359 | B1 | 3/2005 | Mathews | |
| 6,869,360 | B2 | 3/2005 | Marks et al. | |
| 6,878,061 | B2 | 4/2005 | Baerlocher et al. | |
| 6,884,167 | B2 | 4/2005 | Walker et al. | |
| 6,890,255 | B2 | 5/2005 | Jarvis et al. | |
| 6,890,257 | B2 | 5/2005 | Baerlocher | |
| 6,899,620 | B2 | 5/2005 | Kaminkow et al. | |
| 6,905,406 | B2 | 6/2005 | Kaminkow et al. | |
| 6,908,383 | B2 | 6/2005 | Baerlocher et al. | |
| 6,913,532 | B2 | 7/2005 | Baerlocher et al. | |
| 6,921,072 | B2 | 7/2005 | Hughes-Watts | |
| 6,921,335 | B2 | 7/2005 | Rodgers et al. | |
| 6,923,720 | B2 | 8/2005 | Loose | |
| 6,926,607 | B2 | 8/2005 | Slomiany et al. | |
| 6,929,952 | B2 | 8/2005 | Baerlocher | |
| 6,955,600 | B2 | 10/2005 | Glavich et al. | |
| 6,960,133 | B1 | 11/2005 | Marks et al. | |
| 6,960,136 | B2 | 11/2005 | Joshi et al. | |
| 6,988,731 | B2 | 1/2006 | Inoue | |
| 6,991,544 | B2 | 1/2006 | Soltys et al. | |
| 7,001,274 | B2 | 2/2006 | Baerlocher et al. | |
| 7,008,324 | B1 | 3/2006 | Johnson et al. | |
| 7,014,560 | B2 | 3/2006 | Glavich et al. | |
| 7,029,395 | B1 | 4/2006 | Baerlocher | |
| 7,052,395 | B2 | 5/2006 | Glavich et al. | |
| 7,066,814 | B2 | 6/2006 | Glavich et al. | |
| 7,094,150 | B2 | 8/2006 | Ungaro et al. | |
| 7,121,943 | B2 | 10/2006 | Webb et al. | |
| 7,169,044 | B2 | 1/2007 | Baerlocher | |
| 7,204,488 | B2 | 4/2007 | Ilievski | |
| RE39,659 | E | 5/2007 | Luciano et al. | |
| 7,216,867 | B1 | 5/2007 | Luciano et al. | |
| 7,258,609 | B2 | 8/2007 | Nordman et al. | |
| 2001/0003709 | A1 | 6/2001 | Adams | |
| 2001/0005690 | A1 | 6/2001 | Boulton | |
| 2001/0009865 | A1 | 7/2001 | Demar et al. | |
| 2001/0015525 | A1 | 8/2001 | Mathews | |
| 2001/0018361 | A1 | 8/2001 | Acres | |
| 2001/0022429 | A1 | 9/2001 | Luciano et al. | |
| 2001/0023199 | A1 | 9/2001 | Walker et al. | |
| 2001/0038178 | A1 | 11/2001 | Vancura | |
| 2002/0010014 | A1 | 1/2002 | Parra et al. | |
| 2002/0010017 | A1 | 1/2002 | Bennett | |
| 2002/0052233 | A1 | 5/2002 | Gauselmann | |
| 2002/0086725 | A1 | 7/2002 | Fasbender et al. | |
| 2002/0137559 | A1 | 9/2002 | Baerlocher | |
| 2002/0165023 | A1 | 11/2002 | Brosnan et al. | |
| 2002/0167126 | A1 | 11/2002 | Raedt et al. | |
| 2002/0169017 | A1 | 11/2002 | Visoenik | |
| 2002/0187827 | A1 | 12/2002 | Blankstein | |
| 2002/0193160 | A1 | 12/2002 | Tarantino | |
| 2003/0025211 | A1 | 2/2003 | Bruce et al. | |
| 2003/0027623 | A1 | 2/2003 | Rose | |
| 2003/0027626 | A1 * | 2/2003 | Marks et al. | 463/20 |
| 2003/0045344 | A1 * | 3/2003 | Webb et al. | 463/20 |
| 2003/0050110 | A1 | 3/2003 | Wichinsky | |
| 2003/0054873 | A1 | 3/2003 | Peterson | |
| 2003/0060266 | A1 | 3/2003 | Baerlocher | |
| 2003/0060269 | A1 | 3/2003 | Paulsen et al. | |
| 2003/0060272 | A1 | 3/2003 | Glavich et al. | |
| 2003/0060281 | A1 | 3/2003 | Vancura | |
| 2003/0069062 | A1 | 4/2003 | Shimizu | |
| 2003/0069063 | A1 | 4/2003 | Bilyeu et al. | |
| 2003/0073480 | A1 | 4/2003 | Thomas et al. | |
| 2003/0073483 | A1 | 4/2003 | Glavich et al. | |
| 2003/0092480 | A1 | 5/2003 | White et al. | |
| 2003/0092490 | A1 | 5/2003 | Gauselmann | |
| 2003/0094752 | A1 | 5/2003 | Mathews et al. | |
| 2003/0098543 | A1 | 5/2003 | Porto | |
| 2003/0153383 | A1 | 8/2003 | Baerlocher et al. | |
| 2003/0155708 | A1 | 8/2003 | Perrie et al. | |
| 2003/0162585 | A1 | 8/2003 | Bigelow et al. | |
| 2003/0195031 | A1 | 10/2003 | O'Donovan et al. | |
| 2003/0203753 | A1 | 10/2003 | Muir et al. | |
| 2003/0207713 | A1 | 11/2003 | Taylor | |
| 2003/0216165 | A1 | 11/2003 | Singer et al. | |
| 2003/0232651 | A1 | 12/2003 | Huard et al. | |
| 2004/0002372 | A1 | 1/2004 | Rodgers et al. | |
| 2004/0017043 | A1 | 1/2004 | Moody | |
| 2004/0038731 | A1 | 2/2004 | Englman | |
| 2004/0048650 | A1 | 3/2004 | Mierau et al. | |
| 2004/0048652 | A1 | 3/2004 | Ching et al. | |
| 2004/0053666 | A1 | 3/2004 | Vancura | |
| 2004/0053669 | A1 | 3/2004 | Gerrard et al. | |
| 2004/0053672 | A1 | 3/2004 | Baerlocher | |
| 2004/0061285 | A1 | 4/2004 | Hughes-Watts | |
| 2004/0063493 | A1 | 4/2004 | Baerlocher | |
| 2004/0067790 | A1 * | 4/2004 | Peterson et al. | 463/20 |
| 2004/0072609 | A1 | 4/2004 | Ungaro et al. | |
| 2004/0072612 | A1 | 4/2004 | Rodgers et al. | |
| 2004/0077398 | A1 | 4/2004 | Jarvis et al. | |
| 2004/0102244 | A1 | 5/2004 | Kryuchkov et al. | |
| 2004/0116177 | A1 | 6/2004 | Frost et al. | |
| 2004/0116179 | A1 * | 6/2004 | Nicely et al. | 463/25 |
| 2004/0137982 | A1 | 7/2004 | Cuddy et al. | |
| 2004/0147306 | A1 | 7/2004 | Randall et al. | |
| 2004/0147311 | A1 * | 7/2004 | Fujimoto | 463/25 |
| 2004/0152500 | A1 | 8/2004 | Baerlocher | |
| 2004/0159590 | A1 | 8/2004 | Mothwurf | |
| 2004/0162129 | A1 | 8/2004 | Nelson | |
| 2004/0162130 | A1 | 8/2004 | Walker et al. | |
| 2004/0171415 | A1 * | 9/2004 | Webb et al. | 463/16 |
| 2004/0176156 | A1 | 9/2004 | Walker et al. | |
| 2004/0212150 | A1 | 10/2004 | Huard et al. | |
| 2004/0219969 | A1 | 11/2004 | Casey et al. | |
| 2004/0242302 | A1 | 12/2004 | Baerlocher | |
| 2004/0242315 | A1 | 12/2004 | Paulsen et al. | |
| 2004/0251624 | A1 | 12/2004 | Hodapp et al. | |
| 2004/0254011 | A1 | 12/2004 | Muskin | |
| 2004/0256804 | A1 | 12/2004 | Huard et al. | |
| 2004/0266510 | A1 | 12/2004 | Kojima | |
| 2004/0266512 | A1 | 12/2004 | Kaminkow | |
| 2004/0266516 | A1 | 12/2004 | Thomas | |
| 2004/0266517 | A1 | 12/2004 | Bleich et al. | |
| 2005/0014550 | A1 | 1/2005 | Rhoten | |
| 2005/0020346 | A1 | 1/2005 | Baerlocher | |
| 2005/0029745 | A1 | 2/2005 | Walker et al. | |
| 2005/0037838 | A1 | 2/2005 | Danaevsky et al. | |
| 2005/0049035 | A1 | 3/2005 | Baerlocher et al. | |
| 2005/0054429 | A1 | 3/2005 | Baerlocher et al. | |
| 2005/0059481 | A1 | 3/2005 | Joshi et al. | |
| 2005/0060050 | A1 | 3/2005 | Baerlocher | |
| 2005/0070354 | A1 | 3/2005 | Baerlocher et al. | |
| 2005/0075163 | A1 | 4/2005 | Cuddy et al. | |

| | | | |
|---|---|---|---|
| 2005/0079911 | A1 | 4/2005 | Nakatsu |
| 2005/0090306 | A1 | 4/2005 | Seelig et al. |
| 2005/0130737 | A1 | 6/2005 | Englman et al. |
| 2005/0176494 | A1 | 8/2005 | Thomas |
| 2005/0192076 | A1 | 9/2005 | Lowery |
| 2005/0192079 | A1 | 9/2005 | Lowery |
| 2005/0215307 | A1 | 9/2005 | Jarvis et al. |
| 2005/0215311 | A1 | 9/2005 | Hornik et al. |
| 2005/0218590 | A1 | 10/2005 | O'Halloran et al. |
| 2005/0233796 | A1 | 10/2005 | Baerlocher et al. |
| 2005/0233801 | A1 | 10/2005 | Baerlocher et al. |
| 2005/0233803 | A1 | 10/2005 | Yang |
| 2005/0255904 | A1 | 11/2005 | Duhamel |
| 2005/0282615 | A1 | 12/2005 | Englman et al. |
| 2005/0282629 | A1 | 12/2005 | Gagner |
| 2005/0285336 | A1 | 12/2005 | Ilievski |
| 2005/0285337 | A1 | 12/2005 | Durham et al. |
| 2006/0003834 | A1 | 1/2006 | Okada |
| 2006/0009283 | A1 | 1/2006 | Englman et al. |
| 2006/0009286 | A1 | 1/2006 | Durham et al. |
| 2006/0014580 | A1 | 1/2006 | Hawthorn |
| 2006/0019744 | A1 | 1/2006 | Roemer |
| 2006/0025193 | A1 | 2/2006 | Gail et al. |
| 2006/0025211 | A1 | 2/2006 | Wilday et al. |
| 2006/0046833 | A1 | 3/2006 | Hatakeyama et al. |
| 2006/0066044 | A1 | 3/2006 | Dabosh |
| 2006/0069619 | A1 | 3/2006 | Walker et al. |
| 2006/0073873 | A1 | 4/2006 | Rodgers et al. |
| 2006/0073897 | A1 | 4/2006 | Englman et al. |
| 2006/0094495 | A1 | 5/2006 | Gelber et al. |
| 2006/0157927 | A1 | 7/2006 | O'Halloran et al. |
| 2006/0157928 | A1 | 7/2006 | O'Halloran |
| 2006/0170154 | A1 | 8/2006 | Matsuno et al. |
| 2006/0170155 | A1 | 8/2006 | Silverman |
| 2006/0178191 | A1 | 8/2006 | Ellis |
| 2006/0205480 | A1 | 9/2006 | Glavich et al. |
| 2006/0217174 | A1 | 9/2006 | Walker et al. |
| 2006/0237905 | A1 | 10/2006 | Nicely et al. |
| 2006/0246989 | A1 | 11/2006 | Glavich et al. |
| 2006/0249899 | A1 | 11/2006 | Lease |
| 2006/0287034 | A1 | 12/2006 | Englman et al. |
| 2006/0287053 | A1 | 12/2006 | Yokota |
| 2007/0021182 | A1 | 1/2007 | Gauselmann |
| 2007/0057452 | A1 | 3/2007 | Dargue |
| 2007/0060292 | A1 | 3/2007 | Peterson |
| 2007/0069459 | A1 | 3/2007 | Vidondo |
| 2007/0075488 | A1 | 4/2007 | Pececnik |
| 2007/0135203 | A1 | 6/2007 | Nicely |

FOREIGN PATENT DOCUMENTS

| | | | |
|---|---|---|---|
| AU | PO7780 | | 7/1997 |
| AU | 199717601 | B2 | 9/1997 |
| AU | 199917318 | A1 | 9/1999 |
| AU | 200245837 | | 12/2002 |
| DE | 3105266 | | 9/1982 |
| DE | 8710757 | | 11/1987 |
| DE | 3716849 | | 12/1988 |
| DE | 19600787 | | 5/1997 |
| DE | 19613455 | | 8/1997 |
| DE | 19936196 | | 1/2001 |
| EP | 60 019 | A1 | 9/1982 |
| EP | 0 558 307 | A2 | 2/1993 |
| EP | 0 753 331 | A2 | 1/1997 |
| EP | 753 331 | A2 | 1/1997 |
| EP | 0 874 337 | A1 | 10/1998 |
| EP | 874 337 | A1 | 10/1998 |
| EP | 0 926 645 | A2 | 6/1999 |
| EP | 0 945 837 | A2 | 9/1999 |
| EP | 945 837 | A2 | 9/1999 |
| EP | 0 981 119 | A2 | 2/2000 |
| EP | 0 984 407 | A2 | 3/2000 |
| EP | 0 984 408 | A2 | 3/2000 |
| EP | 0 989 531 | A2 | 3/2000 |
| EP | 989 531 | A2 | 3/2000 |
| EP | 1 076 321 | A1 | 2/2001 |
| EP | 1 195 730 | A2 | 4/2002 |
| EP | 1 226 851 | | 7/2002 |
| EP | 1 513 116 | A2 | 9/2004 |
| EP | 1 589 501 | A1 | 11/2004 |
| EP | 1 536 388 | A1 | 1/2005 |
| EP | 1 513 114 | A2 | 3/2005 |
| EP | 1 513 116 | A2 | 3/2005 |
| EP | 1 513 117 | A2 | 3/2005 |
| EP | 1 580 701 | A2 | 3/2005 |
| EP | 1 513 114 | A3 | 6/2005 |
| EP | 1 589 501 | A1 | 10/2005 |
| EP | 1 671 684 | | 6/2006 |
| EP | 1 710 000 | | 10/2006 |
| EP | 1 721 642 | | 11/2006 |
| EP | 1 736 215 | | 12/2006 |
| EP | 1 769 828 | | 4/2007 |
| GB | 970806 | | 9/1964 |
| GB | 2 101 380 | A | 1/1983 |
| GB | 2 137 392 | A | 10/1984 |
| GB | 2 262 642 | A | 6/1993 |
| GB | 2 292 245 | | 2/1996 |
| GB | 2 292 245 | A | 2/1996 |
| GB | 2 322 217 | | 8/1998 |
| GB | 2 354 179 | | 3/2001 |
| GB | 2358591 | | 8/2001 |
| GB | 2 371 494 | | 7/2002 |
| GB | 2 382 911 | | 6/2003 |
| GB | 2 382 911 | A | 6/2003 |
| GB | 2 387 950 | A | 10/2003 |
| GB | 2395139 | | 5/2004 |
| GB | 2 431 362 | | 4/2007 |
| JP | 60099278 | A | 6/1985 |
| WO | WO 85/00910 | | 2/1985 |
| WO | WO 97/32285 | | 9/1997 |
| WO | 9738766 | | 10/1997 |
| WO | WO 98/00207 | | 1/1998 |
| WO | WO 99/03078 | | 1/1999 |
| WO | WO 00/32286 | | 6/2000 |
| WO | WO 00/33269 | | 6/2000 |
| WO | WO 00/66235 | | 11/2000 |
| WO | WO 00/76606 | A1 | 12/2000 |
| WO | WO 01/26019 | A1 | 4/2001 |
| WO | WO 02/056984 | | 7/2002 |
| WO | WO 02/078804 | | 10/2002 |
| WO | WO 02/078804 | A1 | 10/2002 |
| WO | WO 03/026757 | | 4/2003 |
| WO | WO 03/026757 | A1 | 4/2003 |
| WO | WO 2004/023400 | | 3/2004 |
| WO | WO 2004/025584 | A2 | 3/2004 |
| WO | WO 2005/077480 | | 8/2005 |
| WO | WO 2005/077480 | A1 | 8/2005 |
| WO | WO 2005/083599 | | 9/2005 |
| WO | WO 2005/083599 | A1 | 9/2005 |
| WO | WO 2006/014833 | A2 | 2/2006 |
| WO | WO 2006/015442 | | 2/2006 |
| WO | WO 2006/015442 | A1 | 2/2006 |
| WO | WO 2006/017431 | | 2/2006 |
| WO | WO 2006/017431 | A2 | 2/2006 |
| WO | WO 2006/061616 | | 6/2006 |
| WO | WO 2006/078219 | | 7/2006 |
| WO | WO 2006/094398 | | 9/2006 |
| WO | WO 2006/097007 | | 9/2006 |
| WO | WO 2007/024202 | | 3/2007 |
| WO | WO 2007/033430 | | 3/2007 |
| WO | WO 2007/077449 | | 7/2007 |
| WO | WO 2007/080421 | | 7/2007 |

OTHER PUBLICATIONS

"A Salute to Game Shows," The Price is Right—Pricing Games, printed from schuminweb.com/game-shows/shows/price-is-right/pricing-games.htm on Mar. 16, 2001.

Big Times Red, White & Blue Advertisement written by IGT published 2005.

Bonus Games Advertisement written by IGT, published in 1999.

Bunco Dice History and Rules, printed from http://world-bunco.com/history.html, on May 22, 2000.

Creepy and Kooky Article written by Frank Legato, published by Strictly Slots in Jul. 2000, pp. 52-54.

Frome, Lenny, JB06 Jacks or Better, Winning Strategies for Video Poker, p. 22.

Frome, Lenny, KB 1 Kings or Better, Winning Strategies for Video Poker, p. 52.

Jackpot Party Advertisement on website page http://www.wmsgaming.com/products/slot/jpp/index.html, printed on Mar. 21, 2001.
Jackpot Party Brochures and Articles written by WMS Gaming, Inc., published Mar. 1998.
Jackpot Party Video 9-Line Advertisement written by WMS Gaming, Inc., available in 1999.
Jeopardy Advertisement written by IGT, published in 2000.
Jeopardy Video Slots advertisement written by IGT, published in 2000.
Jeopardy, MegaJackpots Advertisement written by IGT, published in 1998.
Monopoly Blackjack Edition Game, described in Mikohn brochure, published in 2000.
Multi-Action Blackjack brochure, http://conjelco.com/faq/bj.html from Apr. 25, 2001, printed on Jul. 30, 2001.
Multi-Play Poker by Bally Gaming, described in Strictly Slots, published in Dec. 2000.
Multi-Play Poker by Bally Gaming, printed from ballygaming.com/products/multi-play-poker.html on Apr. 25, 2001.
Play It Again Poker Brochure, written by IGT, published in 1999.
Power Slotto Brochure published by AC Coin & Slot prior to 2002 in or before December thereof.
Slots 2003 Article written by Melissa Raimondi, published in Strictly Slots in Jan. 2003.
Steemroller Dice Game, described in brochure of Steehn Gaming Systems, Inc., date unknown.
Super Bonus Poker by Bally Gaming, described in Strictly Slots, published in Apr. 2000.
Super Times Pay Poker Advertisement, written by IGT, published in 2003.
Totem Pole Advertisement, written by IGT, published in 1997, in or before December thereof.
Turboreel by Barcrest, available prior to Apr. 14, 2003 (with English Translation).
We Make Gaming Fun! Advertisement written by WMS Gaming Inc., available prior to Apr. 14, 2003.
Wheel of Madness Game, described in AC Coin & Slot brochure, published in 2000.
Alfastreet D8 description, Alfa street Gaming Instruments, available on or before Nov. 13, 2006.
Alfastreet M8 description, Alfa street Gaming Instruments, available on or before Nov. 13, 2006.
American Bandstand Brochure written by Anchor Games, published in 2001.
Blurring the Green-Felt Line, written by International Gaming & Wagering Business, published in Jan. 2003.
Bonus Roulette Brochure written by R. Franco, available prior to Sep. 25, 2006.
Buck's Roulette Brochure written by R. Franco, available prior to Sep. 25, 2006.
Classic Pot of Gold Brochure written by Ace Coin Equipment Ltd., available prior to Nov. 10, 2006.
Cyberdyne Gaming Brochure written by Cyberdyne Gaming, available prior to Nov. 10, 2006.
Elvis Hits Advertisement written by IGT, published in 1999.
Frog Prince article written by International Game Technology, published in 2001.
Live Random Dice Machines, written by General Automatic Amusement, available prior to Nov. 10, 2006.
Lucky Dolls, written by Strictly Slots, published in May 2002.
Megastar Family description, Aristocrat Technologies, Inc., available on or before Nov. 13, 2006.
Mistress of the Dark™ Advertisement written by IGT, published in 2002.
Monte Carlo advertisement, written by Bally Gaming, Inc., published in 2002.
Odds on Gaming™, Inc. brochure, published by Odds on Gaming, available prior to Nov. 10, 2006.
Pick a Prize Brochure written by Acres Gaming Incorporated, published prior 2001.
R&B™ Brochure published by AC Coin & Slot, available prior to Sep. 25, 2006.
Rapid Roulette™ written by John Huxley Ltd., published in 2002.
Roulette Grand Jeu brochure, written by Amatic Industries, available prior to Nov. 10, 2006.
Roulette written by Atronic Casino Technology, published in 1999.
Royal Roulette advertisement written by Barcrest Games, available prior to Sep. 25, 2006.
Royal Roulette Brochure written by Impulse Gaming Ltd., available prior to Nov. 10, 2006.
Silver City Roundup Brochure published by AC Coin & Slot, available prior to Sep. 25, 2006.
Slot Machine Buyer's Handbook, A Consumer's Guide to Slot Machines written by David L. Saul and Daniel R. Mead, published in 1998.
Slot Machines and Coin-Op Games written by Bill Kurtz, published in 1997.
Slot Machines on Parade, 1st edition written by Robert N. Geddes and illustrated by Daniel R. Mead, published in 1980.
Slot Machines written by Marshall Fey, published in 1983, 1989, 1991, 1994, 1997.
Take Your Pick Article written by Strictly Slots, published in Mar. 2001.
Technique of Victory, written by Odrex, available prior to Nov. 10, 2006.
Wheel of Fortune Special Edition Classic Spin Video Slots, written by IGT, published before Sep. 30, 2004.
Wheel of Fortune Video advertisement, published by IGT in 1999.
Wheel of Fortune Video Slots advertisement, published by IGT in 2002.
Wheel Spins Bonus (Video Wheel of Fortune) article written by IGT, published before Sep. 30, 2004.
Double Roulette Wheel Excerpt, Loose Change Magazine, Oct. 1993, p. 26.
Animator, [online] [printed on Nov. 8, 2006]. Retrieved from the Internet at <URL:http://www.tcsjohnhuxley.com.au/products/displays/animator.htm>.
Big Times Red, White & Blue Advertisement written by IGT published in 2005.
Black Swan Paytable Display written by IGT, published prior to 2001.
Boot Scootin Article written by Strictly Slots/Aristocrat Leisure Industries, PTY Ltd., published prior to Jul. 2002.
Break the Spell Advertisement written by Atronic Casino Technology, Ltd., published in 1999.
Break the Spell Article written by Strictly Slots/Atronic Casino Technology, Ltd., published in Sep. 2000.
Break the Spell Atronic Web Page, published in Jan. 2001.
Bunco History and Rules, printed from http://world-bunco.com/history.html on May 22, 2000.
Cash Chameleon Article written by Strictly Slots/Aristocrat Leisure Industries, PTY Ltd., published in Apr. 2001.
Catch A Wave Advertisement written by IGT, published in Dec. 2000.
Cossack Dancer Advertisement written by Olympic Video Gaming, published prior to 2002.
Creepy and Kooky written by Frank Legato, published by Strictly Slots in Jul. 2000, pp. 52-54.
Description of Symbol Feature in Australian Ufo Gaming Machine written by Barcrest Ltd., published in 1995.
Dolphin Treasure Advertisement written by Aristocrat Leisure Industries Pty., Ltd., published in 1996.
Double Diamond Line Advertisement written by Bally Gaming Systems, published in 2000.
e-FX Roulette Display, [online] [printed on Nov. 8, 2006]. Retrieved from the Internet at <URL: file://C:\DOCUME~1\rys\LOCALS~1\Temp\S4M2B8E0.htm>.
Enchanted Forest™ Gaming Description from Aristocrat, available in 1994.
Enchanted Unicorn Advertisement written by IGT, published in 2001.
European Search Report from EP Patent Application EP 03 813 403.7.
Family Feud Bullseye advertisement, printed from www.igtonline.com/megajackpots/new_games/family_feud_bullseye_slots.html on Mar. 2, 2005 and available in 2003.

Field Testing New Slots Article, written by Strictly Slots, published in Jul. 2000.
Fishin' Buddies Article published in Strictly Slots/Anchor Games, published in Apr. 2001.
Fully Automated Wheel, [oneline] [printed on Nov. 1, 2006]. Retrieved from the Internet at <URL:http://www.nrcgamingsystems.com/our_products.asp>.
Happy Camper Advertisement written by IGT, published in 2001.
Introducing the "Smiling Ape" Machine Advertisement (including Joker's Wild Poker description) written by IGT, published prior to 2001.
Jackpot Party Brochures and Articles written by WMS Gaming, Inc., published in Mar. 1998.
Jackpot Party Video 9-Line Advertisement written by WMS Gaming, Inc., available prior to Feb. 23, 2004.
Joker's Wild Advertisement written by IGT, published prior to 2001.
Little Green Men, Jr. Advertisement written by A.C. Coin and Slot Services Company, published prior to 2002.
Loco Loot Article written by Strictly Slots/Aristocrat Leisure Industries, PTY Ltd., published in May 2002.
LuminAR (Illuminated Roulette), [online] [printed on Oct. 31, 2006]. Retrieved from the Internet at <URL:http://www.tcsjohnhuxley.com.au/products/roulette/luminar.htm>.
Mark VII Wheel, [online] [printed on Oct. 31, 2006]. Retrieved from the Internet at <URL:http://www.tcsjohnhuxley.com.au/products/roulette/roulettewheels/markvii.htm>.
Mauritian Roulette from Ultimate Success Gaming, [online] [printed on Oct. 31, 2006]. Retrieved from the Internet at <URL:http://www.gamingfloor.com/features/usg/MagicR.htm>.
Monopoly Blackjack Edition Game described in Mikohn brochure, published in 2000.
Mountain Money Article written by Strictly Slots/Aristocrat Leisure Industries, PTY Ltd., published in Jun. 2002.
On the House Advertisement written by Olympic Video Gaming, published prior to 2002.
Penguin Pays Advertisement written by Aristocrat Incorporated, published in 1998.
Power Slotto Brochure published by AC Coin & Slot in or before Dec. 2002.
Reel Magic™ Gaming Machine Description written by IGT, available in 1986.
Roulette Wheel Analysis, [online] [printed on Oct. 31, 2006]. Retrieved from the Internet at <URL:http://www.tcsjohnhuxley.com.au/products/roulette/roulettewheelanalysis.htm>.
Roulette Wheels catalog, published by Gaming Partners International SAS, available prior to Nov. 10, 2006.
Saturn Data Logger, [online] [printed on Oct. 31, 2006]. Retrieved from the Internet at <URL:http://www.tcsjohnhuxley.com.au/products/roulette/santurndatalogger.htm>.
Saturn Wheel, [online] [printed on Oct. 31, 2006]. Retrieved from the Internet at <URL: http://www.tcsjohnhuxley.com.au/products/roulettewheels/saturn.htm>.
Slot Machines, A Pictorial History of the First 100 Years, written by Marshall Fey, published by Liberty Belle Books, 1983 1989, 1991, 1994, 1997.
Slots 2003 Article written by Melissa Raimondi, published in Jan. 2003.
Spin Til You Win Game Description written by IGT, published in 1996.
Starburst Wheel, [online] [printed on Oct. 31, 2006]. Retrieved from the Internet at <URL:http://www.tcsjohnhuxley.com.au/products/roulette/roulettewheels/starburst.htm>.
Sure to Beat the Bank, article located on the web at http://query.nytimes.com/mem/archive-free/pdf?r=1&res=9501E3DB1E3EEF33A25755C2A9679C94679FD7CF&oref=slogin, The New York Times, published Jan. 1886.
The Basics of Winning Video Poker (Chapter VI Deuces Wild & Chapter VII Jokers Wild) written by J. Edward Allen, published in 1990.
The Latest Buzz Article written by Bally Gaming Systems, published in Fall 2000.
Turboreel by Barcrest (with English Translation), available in 2005.
We Make Gaming Fun! Advertisement written by WMS Gaming Inc., available prior to Feb. 23, 2004.
Wild Bear Salmon Run Advertisement written by IGT, published in 2003.
Wild Streak Advertisement written by WMS Gaming, Inc., published in Strictly Slots Mar. 2001.
Your Real Key to Gaming Success Advertisement (including Roll Over Beethoven and Wild Fortune) written by Olympic Video Gaming, publishing prior to Feb. 23, 2004.
International Search Report in Corresponding European Application EP 07120368, Mailed Jun. 11, 2008.
European Search Report dated Jul. 18, 2011 for corresponding European Appl. No. 06 848 664.6.

* cited by examiner

| INDICATED SYMBOL IN A GROUP OF SIX SYMBOLS 28 | RESULT 31 |
|---|---|
| 33 FIRST INDICATED SYMBOL IN THE GROUP | 2x |
| SECOND INDICATED SYMBOL IN THE GROUP | 12x |
| THIRD INDICATED SYMBOL IN THE GROUP | 25x |
| FOURTH INDICATED SYMBOL IN THE GROUP | 100x |
| FIFTH INDICATED SYMBOL IN THE GROUP | 1000x |
| SIXTH INDICATED SYMBOL IN THE GROUP | 25,000x |
| ANY REPEATED SYMBOL IN THE GROUP | SEQUENCE CONTINUES 35 |
| NO INDICATED SYMBOL IN THE GROUP | SEQUENCE TERMINATES |

32 ESCALATING AWARD TABLE

FIG. 2

ROTOR-BASED GAMING DEVICE HAVING A SECONDARY AWARD SYSTEM

PRIORITY CLAIM

This application is a non-provisional application of, and claims priority to and the benefit of, U.S. Provisional Patent Application No. 60/748,848, filed on Dec. 9, 2005, which is hereby incorporated by reference in its entirety.

CROSS REFERENCE TO RELATED APPLICATIONS

The present application relates to the following commonly-owned pending patent applications: U.S. patent application Ser. No. 11/558,777 filed on Nov. 10, 2006; U.S. patent application Ser. No. 11/119,997 filed on May 2, 2005; U.S. patent application Ser. No. 11/609,149 filed on Dec. 11, 2006; U.S. patent application Ser. No. 11/064,314 filed on Feb. 23, 2005; and U.S. patent application Ser. No. 11/609,176, filed on Dec. 11, 2006.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

There are a variety of games to play in casinos and other gaming environments. Roulette is one commonly known game which involves a moving wheel and a ball which travels along the moving wheel. Depending upon where the ball stops, the player may win or lose a bet. There is a need to increase the level of interest, excitement and volatility associated with playing Roulette-related games. There is also a need to enhance the operational functionality of Roulette-related games or otherwise provide improvements to, and interesting variations of, Roulette-related games.

SUMMARY

The gaming device and method, in one embodiment, includes a spinning wheel or rotor and a wagering layout operable for play of a Roulette game. The game can be played at a gaming table with a live dealer, through a stand alone gaming machine, or though a computer network such as the Internet. Several players can simultaneously place bets on the wagering layout. The wager layout includes a plurality of wagering areas which enable the players to bet on where the ball will land on the rotor.

The game is administered by a dealer which can be a human dealer, a human dealer operating in a casino, a feed or transmission of a video of a dealer operating in a live game, through a real-time video feed of a live casino game, a computerized dealer, a virtual dealer of a casino, a gaming device, a gaming establishment, or a game system provided through a data network such as the Internet.

Once the bets are placed, the dealer spins the rotor in one direction. Then the dealer launches a ball onto the rotor, typically in the opposite direction. The rotor has a plurality of pockets or landings. The bet outcomes for the primary Roulette wheel game are based on which landing is the stopping place or receiver for the ball.

In one embodiment, the gaming device enables a player to place a primary wager on one or more of the symbols and a secondary wager on at least one designated secondary award group of the symbols. After a spin of the rotor, the ball indicates a symbol and the dealer resolves the primary wager based on a primary payout schedule. The dealer resolves the secondary wager based on a secondary payout schedule. In the secondary payout schedule, an award is associated with cardinality of unique, consecutive outcomes of symbols belonging to the secondary award group wagered on. Subsequent symbols are generated or indicated, and wagers are resolved until the sequence is terminated based upon sequence termination rules. For example, when the ball indicates a symbol in the spin of the rotor, the dealer determines if that indicated symbol belongs to the secondary award group wagered on. If the indicated symbol belongs to the secondary award group wagered on, the dealer provides the player with an award based on the secondary payout schedule. The dealer then spins the rotor again to indicate another one of the symbols. The dealer makes another determination of whether the indicated symbol is included in, or belongs to, the secondary award group wagered on. If the indicated symbol belongs to the secondary award group wagered on, the dealer provides the player with an award based on the secondary payout schedule. In one embodiment, the dealer provides an increased award for each consecutive outcome which consecutively belongs to the secondary award group. The dealer continues to spin the rotor and resolves the primary and secondary wagers with the primary and secondary payout schedules until a termination condition is met. In one embodiment, the termination condition includes an indication of a symbol outside or not being in the secondary award group of symbols, breaking the sequence. In such embodiment, the dealer provides or reserves additional awards for the player for each spin resulting in a consecutive indication of a symbol of the secondary award group. In one embodiment, the game terminates when all of the symbols within the secondary award group have been indicated.

The gaming device disclosed achieves a plurality of technical effects, including, but not limited to, a chip transporter or conveyor associated with one or more award increasers as described in detail below.

Additional features and advantages are described herein, and will be apparent from, the following Detailed Description and the figures.

BRIEF DESCRIPTION OF THE FIGURES

FIG. 2 is a table of an example secondary award group of symbols associated with one embodiment of the game system.

DETAILED DESCRIPTION

Rotor-Based Game System

Figure 1:
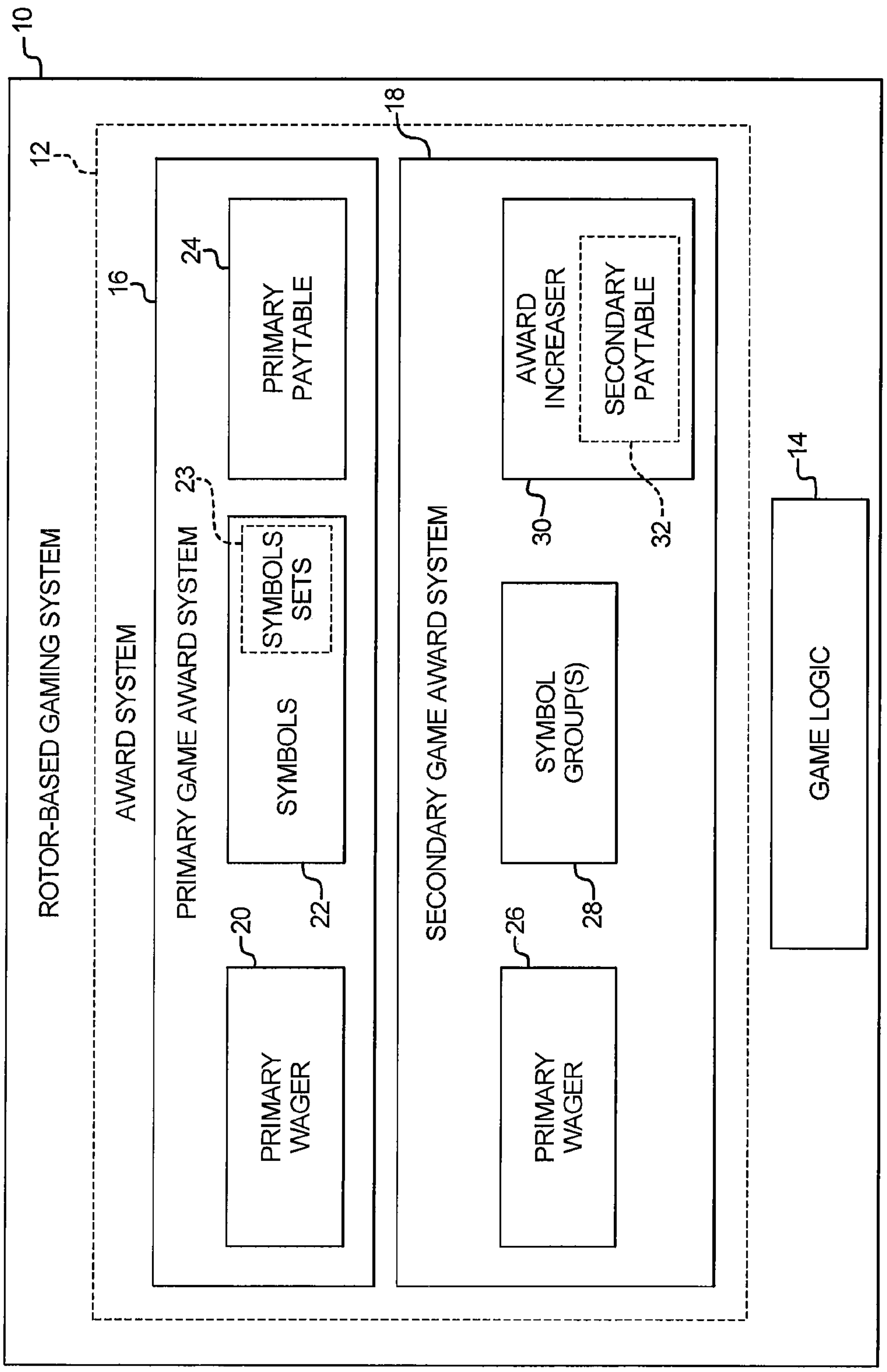
FIG. 1 is a schematic view of one embodiment of a rotor-based game system, wherein the game system includes a plurality of symbols.

Referring now to FIGS. 1 and 2, a gaming or game system 10, in one embodiment, is operable for the play of a primary game involving a Roulette-based rotor. One or more players can play the rotor-based primary game at the same time, for example, on a gaming table or at different gaming devices. The game system 10 determines a primary game outcome for any bets placed by the one or more players. The game system 10 can be configured for the play of various types of Roulette games, including, but not limited to, American style Roulette, European style Roulette or any suitable variation of such styles based on the spin of a wheel.

In one embodiment described further below, the game system 10 is associated with a rotor-based game 12. The rotor-based game 12 provides a secondary sequence for additional wagering opportunities to one or more players. These additional wagering opportunities are provided in addition to, or in replacement of, one or more of the conventional wagering opportunities in various types of Roulette games.

Depending upon the embodiment, the rotor-based game can be implemented in a mechanical, electro-mechanical or virtual form, as described in greater detail below. In mechanical or electro-mechanical form, a human dealer or computerized dealer can facilitate the operation of the rotor while in all forms, and a computerized dealer can facilitate the operation of the rotor, such as through a data network or internet. Irrespective of the implementation of the rotor-based game, in one embodiment of the game system 10, the game system 10 automatically starts a secondary sequence if a ball or other marker lands on or adjacent to a symbol 22 (or symbol landing associated with the symbol 22) in a designated secondary award group 28. In one example of this embodiment, the game system 10 enables only those players who bet on that secondary award group 28 to be eligible to receive the secondary outcome generated by the secondary sequence. In such example, the application of the secondary outcome is specific to the player who had placed the qualifying wager on said secondary award group. In one embodiment, primary wagers can continue to be placed by a player during secondary sequence rounds irrespective of whether or not said player has a wager in an active secondary sequence. In another embodiment, primary wagers may be required for all spins, including for continuation of secondary sequence spins. In another embodiment, the player may be required to place either a primary wager or a secondary wager for initial play, but not be required to place additional primary wager if said player has a wager on an active secondary sequence.

In one embodiment, a player must place a designated type or amount of wager to qualify for the initiation of a secondary sequence. This is sometimes referred to as a buy-a-pay or a buy-a-bonus proposition.

In one embodiment illustrated in FIGS. 1 and 2, the game system 10 includes an award system 12 and game logic 14. The award system 12 includes a primary award system 16 and a secondary or bonus game award system 18. The primary award system 16 includes a primary wager 20 placeable on a plurality of symbols 22. The primary wager 20 is also placeable on a set 23 of symbols 22 to increase the convenience of betting on multiple symbols 22 at once. The symbols 22 are displayed by a rotor (not shown). In one embodiment, a plurality of the symbols 22 are indicatable by a ball or marker after each spin of the rotor. In one example, a symbol 22 is indicated by the landing of a ball adjacent to one of the symbols 22 so as to indicate such symbol 22 on the rotor. An award amount which is based on the wager and determined by a primary payout schedule or primary paytable 24 depending on which symbol 22 is indicated by a ball or other marker moving relative to the rotor. In one embodiment, the primary paytable 24 corresponds to the paytable of conventional Roulette-related games.

The secondary game award system 18 includes a secondary wager 26 placeable on at least one secondary award group 28 of the symbols 22. In one embodiment, the secondary award group is one of a plurality of player selectable secondary award groups 28 of the symbols 22. It should be appreciated that a secondary award group 28 can be the same as or different from a symbol set 23. In either case, the system 10 produces an award amount which is based on the secondary wager 26 according to a secondary payout schedule or secondary paytable 32. The award amount, on a play-by-play basis, is provided to the player when the following conditions are met: (a) a wager 26 is placed on the secondary award group 28, and (b) the rotor spins a first time to indicate one of the symbols 22 within the secondary award group 28. An award increaser or multiplier 30 determines an award relative to the size of the secondary wager and the progress of the sequence relative to a payout schedule. In one example, the award amount or the increase varies with the magnitude of the wager 26. In one embodiment, the award multiplier 30 is specified by the secondary paytable 32 applicable to the symbols 22 within the secondary award group 28. In one embodiment, the award system 18 is operable with the primary wager 20 rather than requiring a secondary wager 26. Here, part or all of the primary wager 20 is applied to the secondary award group 28 bet upon by the player. In one embodiment, a primary wager is not required for a secondary wager to be placed. In another embodiment, a primary wager is required for a secondary wager to be placed. In one embodiment, a primary wager is required for all spins, including the continuation of a player's secondary wager opportunity in an active secondary sequence. In another embodiment, a primary wager is optional during secondary spins. In yet another embodiment, no primary wagers are allowed during secondary spins.

In one embodiment, the system 10 specifies a continuation condition for the secondary award system 18. As long as the continuation condition is fulfilled, the player has the opportunity to receive consecutive award amounts based on the paytable 32 over the course of consecutive spins of the rotor. The continuation can include any suitable condition, including, but not limited, to hitting any symbol within the secondary award group 28 or hitting any previously un-hit symbol within the secondary award group 28. This process continues until a termination condition is fulfilled. To track such pattern, the system 10 has a pattern tracker as described below.

The termination condition for the sequence of the secondary award system 18 can include any suitable condition, including, but not limited, to hitting a symbol outside of the secondary award group 28 or hitting a previously hit symbol.

In one embodiment, the termination condition is based on an activated state of symbols within the secondary award group. Each time the ball indicates a symbol within the secondary award group, that symbol has an activated or "on" state. If, in a subsequent play, the ball indicates an activated symbol, that symbol then changes to a deactivated or "off" state. The termination condition is met when all the symbols in the secondary award group are activated. In this embodiment, the system can include a payout schedule which varies the secondary award with the ratio of on symbols to off symbols which is present when the ball lands so as to indicate a symbol outside of the secondary award group.

In one embodiment, the award system 18 enables the player to receive a never ending amount of sequential secondary awards based on sequential secondary wagers for sequential rounds of play. Such perpetual sequence can be in effect even if the player reaches a maximum level or threshold associated with the secondary award group.

In addition, the system 10 can include an anti-terminator operable to suspend or nullify the fulfillment of the termination condition. For example, a suspension condition can enable the player to miss a symbol of the secondary award group 28 one or more times without terminating the sequence of the secondary award system 18. For example, instead of ending the secondary sequence when one of the spins of the rotor results in no indication of any symbol 22 in the secondary award group 28 (i.e., a symbol 22 outside the secondary award group 28), the system 10 enables the player to continue the sequence.

In one embodiment, the system 10 can enable the player to accumulate anti-terminators for later use to suspend a future termination condition. For example, for each re-hit of a symbol in the secondary award group 28, the system 18 awards the player with an anti-terminator which the player may use in the future to nullify the fulfillment of a future termination condition. In one embodiment, the player may be limited to holding at limited number of anti-terminators at a time. In one embodiment, an anti-terminator may only be applied to certain types of terminations. In one embodiment, a player may forfeit all of his or her anti-terminations if said player's sequence terminates due to the completion of the sequence and/or the attainment of the highest secondary award. In one embodiment, the player's anti-terminator may be automatically redeemed when a sequence would otherwise terminate. In another embodiment, where the player's side bet amount was constant, the player may decide if and when to redeem his or her anti-terminator. For example, a player may prefer not to use his or her anti-terminator to continue a slightly advanced sequence which is about to terminate, and the player might do so in expectation for being able to redeem this in the future to salvage a more valuable sequence. In one embodiment, the player may earn an anti-terminator for achieving a certain threshold in the sequence according to one version of the secondary payout schedule. Alternatively, the system 18 can provide the player with a designated number of anti-terminators, such as one or any other suitable number, upon the initiation of the secondary sequence. In another embodiment, the player may earn an anti-terminator the first time a specific number is hit within the secondary award group upon which the player has wagered. In another embodiment, the player may earn an anti-terminator each time a specific number is hit within the secondary award group upon which the player has wagered.

In one embodiment, the indication of a symbol which has been previously indicated within the same sequence leads to termination. In another embodiment, the indication of a symbol which has been previously indicated within the same sequence leads to an award and a continuation of the sequence. In another embodiment, the indication of a symbol which has been previously indicated within the same sequence leads to no monetary or credit award, but the random assignment of 0 to K number of anti-terminators. In another embodiment, the indication of a symbol which has been previously indicated within the same sequence leads to no award, but continuation of the sequence and the symbol is made to become again eligible for an award if subsequently indicated in the same sequence.

In another embodiment, a sequence may continue on indefinitely for as long as the indicated symbol remains within the selected secondary award group which initiated the sequence. In one example, a payout schedule is defined to pay the player for each consecutive outcome in the selected secondary award group sequence irrespective of whether any of the outcomes were repeated and irrespective if every outcome was attained at least once.

In another embodiment, the player may receive a single award for the player's corresponding secondary wager on an initiated sequence when the sequence terminates. In one embodiment, the player may receive an award for the player's corresponding secondary wager at the end of a secondary sequence relative to the number of symbols in the selected secondary award group that had been hit an odd number of times.

Referring again to FIGS. 1 and 2, the game logic 14 of the system 10 defines the play of the Roulette-related game. The game logic 14 includes, as described in further detail below, maximum wager limits, symbols 22 and sets 23 and secondary award groups 28 of symbols 22 that can be wagered on, and awards based on wagers in the game, such as through the primary and secondary paytables 24 and 32. More specifically, the game logic 14 enables one or more players to place wagers on which symbols 22 will be indicated on a rotor in each play of the game. The rotor is operable with an indicator, such as a ball or other suitable marker, which moves relative to the spinning rotor and stops to indicate one of the symbols on the rotor after each spin. Upon the placement of a wager, a human or computerized dealer spins the rotor. The dealer also ejects or shoots the indicator on the rotor. When the indicator stops traveling, the indicator indicates one of the symbols on the rotor. If the indicated symbol corresponds to a winning outcome (i.e., matches an outcome wagered on by the player), the dealer provides an award to the player based on any placed wagers.

FIG. 2 illustrates one example secondary award group 28 of six symbols. In this example, the secondary award group 28 includes six designated symbols 22 displayed on the rotor. The results 31 are applied to the different possible outcomes 33. If a player places a wager on the secondary award group 28 and one of the symbols 22 in the secondary award group is indicated by the ball or marker on the rotor, the secondary sequence is initiated. As illustrated, if the rotor indicates one of the symbols 22 in the secondary award group 28 in a first spin of the secondary sequence, the system 10 provides a first result to the player, such as an award of 2×, relative to the secondary wager 26. In a subsequent spin of the secondary sequence, if the rotor indicates a second one of the symbols in the secondary award group 28, the system 10 provides a second result to the player, such as an award of 12×, relative to the secondary wager 26. As illustrated, the award multipliers increase with unbroken progress with results in the secondary award group 28. Each award increase is sequentially or incrementally applicable to the amount of the secondary wager 26 after each subsequent spin of the rotor in the secondary sequence which results in the indication of a different one of the symbols 22 within the secondary award group 28. In this manner, a payout schedule can be defined such that the award increase based on the separate secondary awards increase as more symbols 22 are indicated in the secondary award group 28. In one embodiment, the system 10 provides the results 31 independent of the order in which any specific symbols 22 are indicated. In another embodiment described below, the results 31 are dependent upon a designated sequence in which the symbols 22 must be indicated over the course of multiple plays.

In one embodiment, the first result is not associated with an award. For example, if the rotor indicates one of the symbols 22 in the secondary award group 28 in a first spin, the system 10 provides a first result to the player, which is not associated with an award. In a subsequent spin of the secondary sequence, if the rotor indicates a second one of the symbols in the secondary award group 28, the system 10 provides a second result to the player, such as an award of 2×, relative to the secondary wager 26.

In one embodiment, the secondary sequence continues for a plurality of subsequent spins. This embodiment enables a player to continue the secondary sequence after one of the subsequent spins of the rotor results in the indication of one of the symbols 22 outside the secondary award group 28. For example, a second result, such as an award of 12×, can be provided to the player if the rotor indicates one of the symbols 22 in the secondary award group 28 over multiple spins of the rotor. In this example, the spins need not be consecutive for the player to be provided with the second result, such as the award of 12×. In one example of such secondary sequence, a subsequent first spin of the rotor can result in the indication of one of the symbols 22 inside the secondary award group 28, a second subsequent spin of the rotor can result in the indication of one of the symbols 22 outside the secondary award group 28 and a third subsequent spin of the rotor can result in the indication of one of the symbols 22 inside the secondary award group 28. In this example secondary sequence, the player is provided a result, such as an award of 100×, even though the second subsequent spin resulted in the indication of one of the symbols 22 outside the secondary award group 28.

In one embodiment, if the subsequent spin of the secondary sequence results in the rotor indicating the same symbol 22 more than once in the secondary award group 28, the award system 18 causes a result different from the result applied to the initial indication of that symbol. In one embodiment, the player's sequence status is preserved so that the player can continue with the secondary sequence, but no additional prize is awarded. In one embodiment, such second result includes a continuation of the secondary sequence plus the awarding of an anti-terminator for the secondary award group. In one embodiment, the result associated with any repeat symbol indication in the secondary sequence can include an award multiplier as defined in a payout schedule. Such award multipliers may differ relative to how many re-hits have occurred within, such as 1× or 2×, along with the same secondary award group. If any of the spins of the rotor result in no indication of any symbol 22 secondary award group 28, the player loses the wager or bet 26, and the award system 18 causes no award to be provided based on such bet, as illustrated by "sequence terminates" in FIG. 2. In one embodiment, the secondary sequence ends when one of the spins of the rotor results in no indication of any symbol 22 in the secondary award group 28. In another embodiment, the secondary sequence ends when one of the spins of the rotor results in a repeat indication of any symbol 22 in the secondary award group 28. In another embodiment, a defined outcome, such an indication of the symbol "0", may preserve an in-progress sequence.

In one embodiment, the system 18 provides the player with an anti-terminator that, when redeemed, cancels a termination condition. For example, instead of ending the secondary sequence when one of the spins of the rotor results in no indication of any symbol 22 in the secondary award group 28 (i.e., a symbol 22 outside the secondary award group 28), the redemption of an anti-terminator enables the system 18 to ignore this outcome. In this example, the system 18 provides the player with an additional spin 35 to continue the secondary sequence. In one embodiment, the anti-terminator is provided to the player upon the occurrence of a designated symbol 22, such as with any repeat symbol indication, in the secondary sequence. Alternatively, the system 18 can provide the player with a designated number of anti-terminators, such as one or any other suitable number, upon the initiation of the secondary sequence. In another embodiment, the player may earn an anti-terminator the first time a specific number is hit within the secondary award group upon which the player has wagered. In another embodiment, the player may earn an anti-terminator each time a specific number is hit within the secondary award group upon which the player has wagered.

FIGS. 3 to 9 show one example of an operation of the rotor-based game system 10 described above. The rotor-based game system 10 implements the award system 12 and the game logic 14. In addition to standard primary game wagers and game play of the primary game award system 16, this embodiment includes at least one selectable additional wager 26 which corresponds to a designated secondary award group 28 of symbols 22 over one or more spins of a rotor 102. It should be appreciated, however, that in other embodiments, the system 10 enables the player to place a single wager applicable to both the primary award system 16 and the secondary award system 28. Thus, there is no need to place separate primary and secondary wagers 20 and 26 in such embodiment. In another embodiment, the game system enables the player to operate the game entirely by placing secondary wagers on secondary award groups.

In another embodiment, the system requires the player to place a primary wager to start the game, but once the player wins a bet on a secondary award group, the game system enables the player to continue from play to play by making only secondary or streak wagers with no requirement to make a primary wager.

Figure 3:
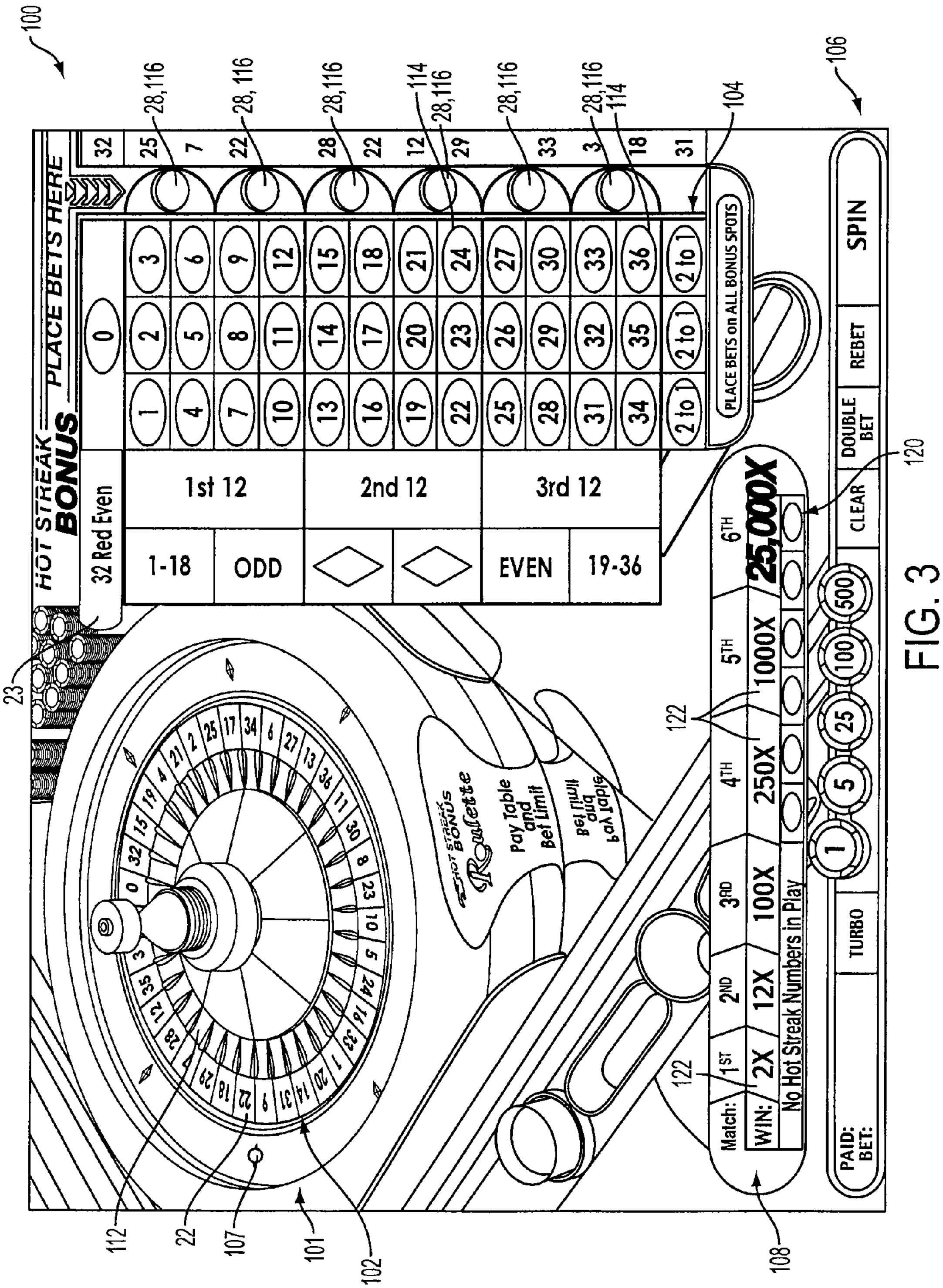
FIG. 3 is a front view of one embodiment of a rotor and a wagering station of the game system.

As illustrated in FIG. 3, the game 100 includes wheel related elements that include a wheel assembly 101 having a rotor 102. The game 100 also includes at least one wagering or betting layout 104. The wagering or betting layout 104 is sometimes referred to as a wagering station. The game 100 enables one or more players to place primary wagers 20 on the wagering layout 104. Also, the players have the option to place secondary bets 26 on one or more desired secondary award groups 28. Upon the placement of wagers 20 and 26, the dealer spins the rotor 102 and the indicator 107 as described above. When the indicator 107 stops spinning, the indicator 107 indicates an outcome of the rotor spin (i.e., one of the symbols 22 on the rotor 102). If the outcome corresponds to a winning outcome (i.e., matches an outcome wagered on by the player), the dealer provides an award to the player based on the placed one or more wagers.

In one embodiment, the game 100 has an outcome tracker 108 operable to track an occurrence of the outcomes (i.e., indicated symbols 22) in one or more of the secondary award groups 28. If one of the symbols 22 of a secondary award group 28 is indicated, the tracker 108 tracks whether subsequent spins result in the indication of any symbols 22 within the secondary award group 28. In one embodiment, this tracking only occurs if a secondary wager had been placed on the secondary award group thus initiating the bet sequence.

In the illustrated embodiment, the rotor 102 has a plurality of the symbols 22 in the form of numerals. The numerals on the rotor 102 can include 1 to 36, 0 and possibly 00. As illustrated, the rotor 102 also includes a plurality of ball landings 112 adjacent to the symbols 22. In this embodiment, the symbols 22 are represented by numerals, but the symbols 22 may be displayed as alphanumeric characters or any other suitable character or image. The symbols 22 may be associated with one or more colors, such as red, black or green, or other suitable characteristics. It should be appreciated that the rotor 102, the symbols 22 and ball landings 112 may be displayed in any suitable format and in any suitable order on the game 100.

Continuing with reference to FIG. 3, the wagering layout 102 includes a plurality of wagering regions 114. In this embodiment, the wagering regions 114 constitute a template of a grid of numbers and betting options. In play of the Roulette game, one or more players can place primary wagers 20 on at least one wagering region 114 or symbol set 23 of the wagering layout 102, and players can also place secondary wagers 26 on one or more secondary award groups 28. The game 100 indicates any placed wagers on the one or more wagering regions 114, sets 23 or secondary award groups 28 of the wagering layout 102 with a suitable marker, such as at least one chip or token having a designated or desired denomination. Each player can control the risk and potential award levels by selecting one or more of the wagering regions 114 and a wager denomination, such as one dollar.

The game 100 displays a plurality of the wagering regions 114 in FIG. 3. Examples of such wagering regions 114 include inside bets or wagers 20 and outside primary bets or wagers 20.

Inside primary bets 20 include a single bet or wager in which each player can place the single bet to cover between one and six numbers. Examples of inside bets include:

| Inside Bet | Bet Description |
|---|---|
| Straight Bet: | Place a chip on one symbol on the wagering layout (e.g., 0, 00 (if available), 1, 12 or 23). |
| Split Bet: | Place a chip between two adjacent numbers on the wagering layout (e.g., 14 and 15). |
| Trio Bet: | Place a chip at an edge of a row to bet on the three numbers along a row on the wagering layout (e.g., 7, 8 and 9). |
| Corner Bet: | Place a chip on the corner of four adjacent numbers on The wagering layout (e.g., 22, 23, 25, and 26). |
| Four Number Bet: | Place a chip on an edge of the wagering layout between two adjacent rows of numbers containing 0, 1, 2, and 3. |
| Five Number Bet: | Place a chip on an edge of the wagering layout between two adjacent rows of numbers containing 0, 00, 1, 2, and 3 (if available). |
| Six Number Bet: | Place a chip on an edge of the betting layout between two adjacent rows of numbers (e.g., 16, 17, 18, 19, 20, and 21). |

Outside primary bets 20 include a single primary bet or wager 20 in which each player can place a single bet to cover an entire set 23 or category of numbers. Outside bets include even money bets and two to one money bets. Examples of even money bets include:

| Even Money Bet | Bet Description |
|---|---|
| Even: | Any even valued number (e.g., 2, 4, 6, etc.) excluding 0 and 00. |
| Odd: | Any odd valued number (e.g., 1, 3, 5, etc.) excluding 0 and 00. |
| Red: | Any red number. |
| Black: | Any black number. |
| Low (1-18): | Any number 18 or lower, excluding 0 and 00. |
| High (19-36): | Any number 19 or greater, excluding 0 and 00. |

Two to one money bets include a dozens bet, wherein a player can place a single primary wager 20 on three different sets of table rows to bet on, and a column bet, wherein a player can place a single wager on a column of numbers in the betting layout. Examples of dozens bets include:

| Dozens Bet | Bet Description |
|---|---|
| 1st 12: | Any number 1 through 12. |
| 2nd 12: | Any number 13 through 24. |
| 3rd 12: | Any number 25 through 36. |

Examples of column bets include:

| Column Bets | Bet Description |
|---|---|
| 1st Column: | Any number of 1, 4, 7, 10, 13, 16, 19, 22, 25, 28, 31, and 34. |
| 2nd Column: | Any number of 2, 5, 8, 11, 14, 17, 20, 23, 26, 29, 32 and 35. |
| 3rd Column: | Any number of 3, 6, 9, 12, 15, 18, 21, 24, 27, 30, 33, and 36. |

In one embodiment, at least one of the wagering regions 114 includes a secondary award group 28 indicated as a designated wagering region or secondary award group 116. Each designated wagering region 116 represents an additional wagering opportunity for the player relative to a conventional Roulette game. This additional wagering opportunity enables the player to play for increased awards. In the example illustrated in FIG. 3, the designated wagering regions 116 include a plurality of player selectable secondary award groups of symbols 22. Each region or secondary award group 116 includes a designated number of symbols 22. In one embodiment, the designated number is one, six or any other suitable number. Accordingly, the designated wagering regions or secondary award groups 116 are each associated with at least one, or a plurality, of the symbols 22. In one embodiment, the player can select the quantity of symbols to be included in the secondary award group. In one embodiment, the player can select which symbols are to be included in the secondary award group.

In the example illustrated in FIG. 3, the game 100 displays a plurality of selectable secondary award groups of symbols 116. To select one of the secondary award groups, a player places a secondary wager 26 corresponding to that secondary award group of symbols. The player can wager on only one secondary award group 116, a plurality of secondary award groups 116 or all of the secondary award groups 116. In one embodiment, a secondary outcome generator selects a secondary award group 116 to be wagered on for the player.

In another embodiment, the system 10 enables the player to select which and how many symbols 22 are to be included in one or more secondary award groups 116. In this embodiment, the player creates or forms a secondary award group 116 of player selected symbols 22 and can do so for a plurality of secondary award groups 116. In one embodiment, the game logic 14 enables or prevents the player from selecting the same symbol 22 to be in more than one player formed secondary award group 116.

As illustrated in FIG. 3, the wagering layout 102 includes a plurality of different wagering regions or secondary award groups 116, which include:

| Wagering Regions | Bet Description |
|---|---|
| 1st Wagering Region: | A first secondary award group or pattern of symbols (e.g., 1, 2, 3, 4, 5, and 6). |
| 2nd Wagering Region: | A second secondary award group or pattern of symbols (e.g., 7, 8, 9, 10, 11, and 12). |
| 3rd Wagering Region: | A third secondary award group or pattern of symbols (e.g., 13, 14, 15, 16, 17, and 18). |
| 4th Wagering Region: | A fourth secondary award group or pattern of symbols (e.g., 19, 20, 21, 22, 23, and 24). |
| 5th Wagering Region: | A fifth secondary award group or pattern of symbols (e.g., 25, 26, 27, 28, 29, and 30). |
| 6th Wagering Region: | A sixth secondary award group or pattern of symbols (e.g., 31, 32, 33, 34, 35, and 36). |

In various embodiments, each designated wagering region or secondary award group 116 includes: (i) any N numbers of the plurality of numbers 22, (ii) any N numbers selected by a player from the plurality of numbers 22, (iii) a single predetermined grouping of N numbers, (iv) a plurality of predetermined groupings of N numbers, or (v) one or more groupings of N numbers selected by a player. It should be appreciated that the player can select which numbers 22 are included in each secondary award group or grouping and how many numbers (N) are included in each secondary award group or grouping. In another embodiment, the player may select a plurality of secondary award groups that have different number of symbols. In another embodiment, the payout schedule associated with a secondary award group may be dependent on the number of symbols within that secondary award group. In another embodiment, the designated wagering region or secondary award group 116 includes numbers substantially adjacent to one another on the wagering layout 102 (e.g., 1, 2, 3, 4, 5, and 6; 17, 18, and 19; or 26, 29, 32 and 35). In another embodiment, the designated wagering region or secondary award group 116 includes numbers substantially adjacent to each other on the rotor 102 (e.g., 9 and 22; 0 and 32; or 13, 36 and 11). In another embodiment, the designated wagering region or secondary award group 116 includes at least one entire category of symbols or numbers (e.g., Low (1-18); 1st 12; or 1st column). It should be appreciated that the designated wagering region or secondary award group 116 may include at least one entire category or type of symbols or numbers in addition to any N numbers of the plurality of numbers 22.

In one embodiment, the game logic 14 limits the wager amount that players can place on the numbers 22 or the secondary award groups 116. For example, in one embodiment, the minimum betting limits and maximum betting limits are secondary award listed in the primary or secondary pay table and displayed to the players. If the minimum table bet is larger than a single chip or token, then a player can place single chip bets as long as the total of all bets meets the minimum betting limit. For example, if a minimum betting limit is $5, the player can place five $1 wagers to meet the minimum betting limit.

In one embodiment, a maximum bet limit is associated with each type of bet, as well as an overall betting limit for each spin of the rotor 102. For example, a maximum bet limit is associated with any inside wagers or bets and another maximum bet limit is associated with any outside wagers or bets. In one embodiment, the limit for a bet on an individual number or symbol 22 is a fraction of the overall maximum betting limit. For example, the maximum bet limit for single number bets is one-twentieth of the table limit, and the maximum bet limit for multi-number bets is one-twentieth of the table limit for every number included in a player position. In one embodiment, there is also a maximum bet limit associated with the designated secondary award groups 116. In one such embodiment, the maximum bet limit associated with each designated secondary award group 116 is a predetermined fixed amount determined by the game logic 14.

The following example table describes the maximum bet, in one embodiment, for each bet opportunity.

| Bet Opportunity | Maximum Bet |
|---|---|
| Straight bet (one number) | 1/20 of maximum table limit |
| Split bet (two numbers) | 2/20 of maximum table limit |
| Trio bet (three numbers) | 3/20 of maximum table limit |
| Corner bet (four numbers) | 4/20 of maximum table limit |
| Six numbers | 6/20 of maximum table limit |
| Column bets (twelve numbers) | 12/20 of maximum table limit |
| Dozens (1-12, 13-24, or 25-36) | 12/20 of maximum table limit |
| Red, Black, Odd or Even, | 18/20 of maximum table limit |
| Low (1-18) and High (19-36) | 18/20 of maximum table limit |
| Secondary award group | designated fixed amount |

In the example illustrated in FIG. 3, each designated wagering region or secondary award group 116 includes six symbols or numbers 22. The number of symbols or numbers 22 associated with, or included in, each designated wagering region or secondary award group 116 may be predetermined, randomly determined, player selectable and/or set to be any suitable number of symbols in accordance with the game logic 14. In one embodiment, different secondary award groups 116 have different numbers of symbols 22. For example, a first secondary award group includes six symbols and a second secondary award group includes three symbols. In another embodiment, different secondary award groups 116 include different symbols 22, wherein no symbol 22 is part of more than one secondary award group 116. It should be appreciated that any of the symbols or symbol categories may constitute one of the secondary award groups 116 and that each of those secondary award groups 116 may include any suitable number of symbols or categories of symbols.

As described above, the game 100 displays the outcome tracker 108. The outcome tracker 108 is associated with the rotor 102, the wagering regions 114 and the designated wagering regions or secondary award groups 116. The outcome tracker 108 is operable to fully or partially track the indication of each symbol 22 by the rotor 102 for each spin thereof. The outcome tracker 108 includes an outcome history 118 that is operable to display a history of the tracked outcomes for each spin of the rotor 102. The outcome tracker 108 also includes a secondary award list 120 of symbols 22. The secondary award list 120 is associated with a selected secondary award group 116 that is selected by a player. The selected secondary award group defines such secondary award list 120. The outcomes on such secondary award list 120 are occurable in association with a plurality of spins of the rotor 102. The outcome tracker 108 is operable to track whether the symbol indicated by the rotor 102 is one of the outcomes on the secondary award list 120. A plurality of award increasers or award multipliers 122 are associated with the outcome tracker 108. If the indicated symbol is a symbol on the secondary award list 120, the dealer designates and holds a secondary award for the player based on one of the award multipliers 122. For instance, if the indicated symbol matches a first symbol on the secondary award list 120, the dealer provides or reserves an award for the player based on a first award multiplier in the payout schedule, such as 2×. If, on a subsequent spin of the rotor, the indicated symbol corresponds to or matches a second symbol on the secondary award list 120, the dealer provides or reserves an award based on a second award multiplier in the payout schedule, such as 12×. The payout schedule can be defined such that the award multiplier increases for each match on the secondary award list 120. In this embodiment, the player's additional award opportunity progresses as the sequence continues. Each time the indicated symbol corresponds to an unique symbol on the secondary award list 120, the award is based on an increased award multiplier and the dealer provides or reserves such increased award for the player. When a termination event occurs, such as the player missing a symbol on the secondary award list 120, the game 100 provides the reserved award to the player.

It should be appreciated that the award increaser is illustrated and described as a multiplier but may include a predetermined or fixed award, a progressive award, a free game, a free spin, an anti-terminator (e.g., which cancels a terminating condition) or any other suitable award or combination of such awards determined by the game implementer.

Figure 4:
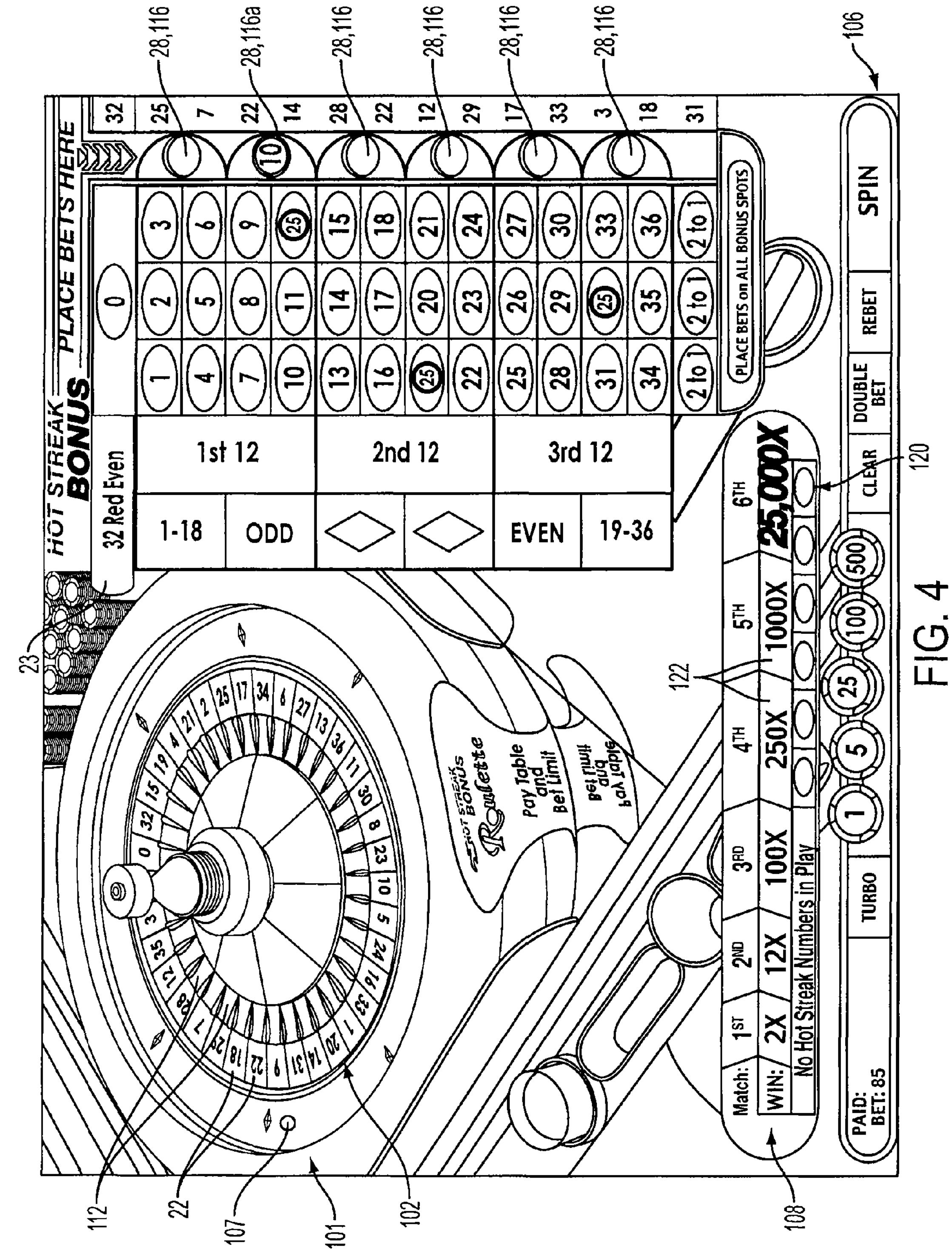
FIG. 4 is a front view of one embodiment of a rotor and wagering station of the game system illustrating a wager placed on a secondary award group of symbols.

FIG. 4 shows the game 100 after a plurality of wagers have been placed on the wagering layout 102. In the illustrated example, one $25 wager is placed on the wagering areas 114 associated with the symbols or numbers 12, 19 and 32. One $10 wager is placed on the designated wagering area or secondary award group 116*a*. The designated wagering area or secondary award group 116*a* includes the wagering areas 114 associated with the symbols or numbers 7, 8, 9, 10, 11, and 12. The $10 wager on the designated secondary award group 116*a* activates that secondary award group of symbols for a designated number of rotor spins. In this embodiment, the designated secondary award group 116*a* is activated for each consecutive spin that results in one of the numbers in the secondary award group 116*a*.

Figure 5:
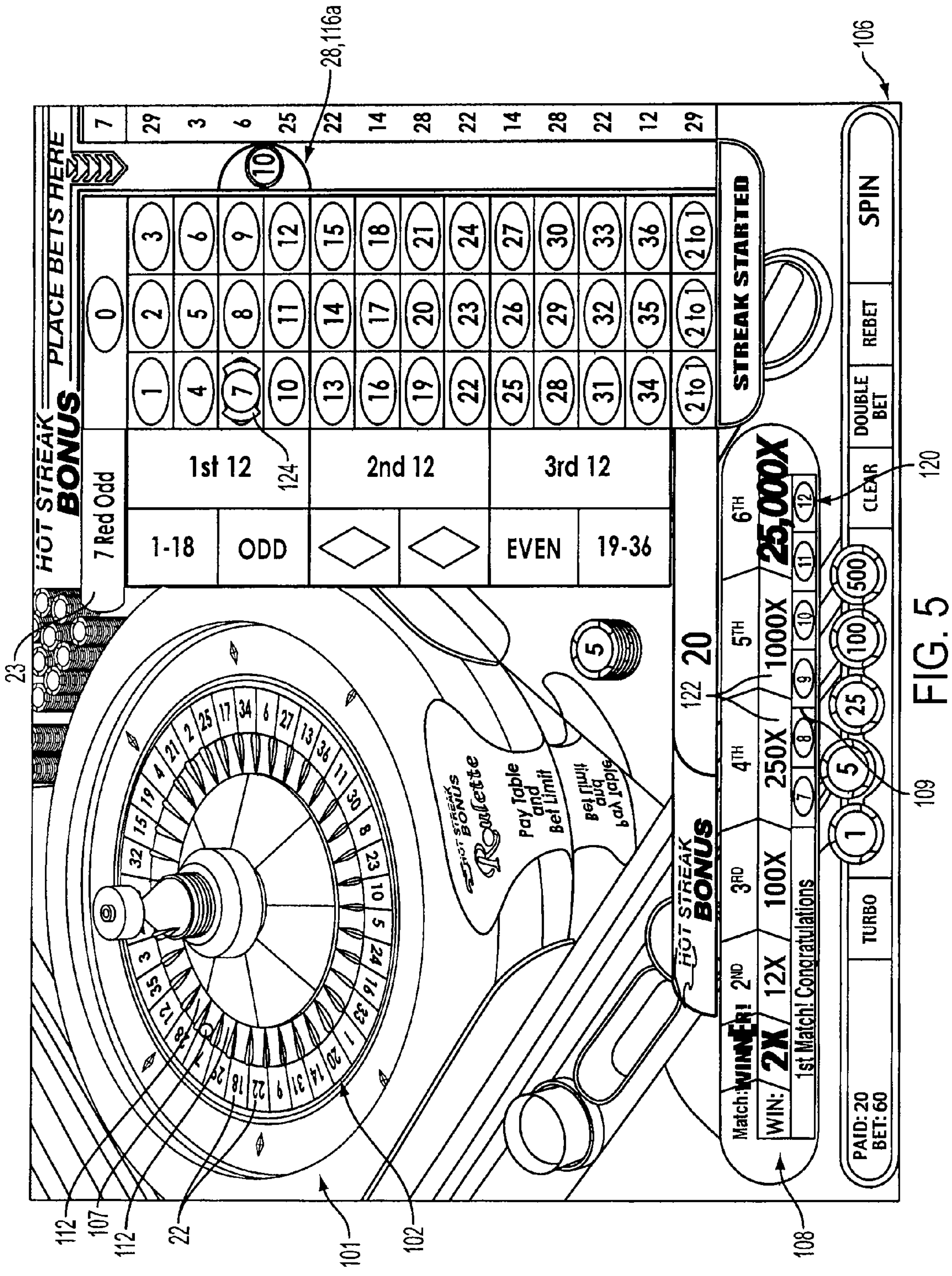
FIG. 5 is a front view of one embodiment of a rotor and wagering station of the game system illustrating the wager placed on the secondary award group of symbols and one of the symbols in the secondary award group being indicated.

FIG. 5 shows the game 100 after the rotor 102 and indicator 107 have indicated the symbol or number "7". In the illustrated example, a marker 124 is displayed on the indicated symbol or number "7" to mark which symbol or number was indicated by the rotor 102 during the spin. The $25 wagers placed on the wagering areas 114 associated with the symbols or numbers 12, 19 and 32 are cleared. The $10 wager placed on the designated wagering area or secondary award group 116*a* initiates an additional award opportunity because one of the numbers in the secondary award group 116*a* (e.g., "7", "8", "9", "10", "11", and "12") was indicated by the rotor 102 (i.e., "7"). As described above, the secondary award group 116*a* remains active since one of the numbers in such secondary award group was indicated by the rotor 102.

Depending upon the embodiment, various events can trigger or activate the increasing award opportunity of the secondary award group 116*a*. In one embodiment, if the rotor spin results in the indication of any one of the symbols or numbers 22 included in the player selected secondary award group 116*a*, the additional award opportunity begins for the player. In another embodiment, the additional award opportunity begins for the player only if the rotor spin results in the indication of a designated number within the secondary award group 116*a*. In one such embodiment, such designated number is the smallest number or the largest number in a numerically ascending secondary award group.

To assist in monitoring the series of outcomes with respect to secondary award group 116*a*, the outcome tracker 108 tracks which symbol or number, if any, on the secondary award list 120 has been completed. As illustrated, the outcome tracker 108 has a marker 109 which may be a betting marker, a check mark or any other suitable marker displayed adjacent to the completed portion of the secondary award list 120. The completed portion of the secondary award list 120 is associated with one of the award multipliers in the secondary award payout schedule 122. In this instance, the completed portion of the secondary award list (i.e., a first match on the secondary award list) is associated with a first award determined by the paytable which specifies a multiplier of 2×. In one embodiment, the payable determines a first award by multiplying a factor of 2× by the $10 wager placed on the designated wagering area or secondary award group 116*a*. The completed portion of the secondary award list 120 and any award multiplier 122 associated therewith is marked or otherwise indicated in another suitable manner. The award won at this point in the additional award opportunity is $20 (i.e., $10 wager placed on the secondary award group 116*a*× 2), and the dealer provides the award to the player. Since the indicated symbol or number "7" was on the secondary award list 120, the dealer provides a second spin for the additional award opportunity in accordance with the game logic 14.

In one embodiment, after the rotor spin results in the indication of one of the symbols 22 in the player selected secondary award group 116*a*, the dealer enables the player to place wagers on one or more additional player selectable secondary award groups 116. In this instance, a single player or multiple players can participate in a plurality of additional award opportunities at the same time. In another embodiment, after the rotor spin results in the indication of one of the numbers 22 included in the player selected secondary award group 116, the dealer prevents the player from placing wagers on one or more additional player selectable secondary award groups 116. In this embodiment, although a player is not able to place additional secondary wagers on another one of the secondary award groups 116, the player can place additional primary wagers on other wagering regions 114, such as the individual numbers or categories of numbers described above. In another embodiment, the system requires the player to place additional primary wagers for the additional award opportunities.

Figure 6:
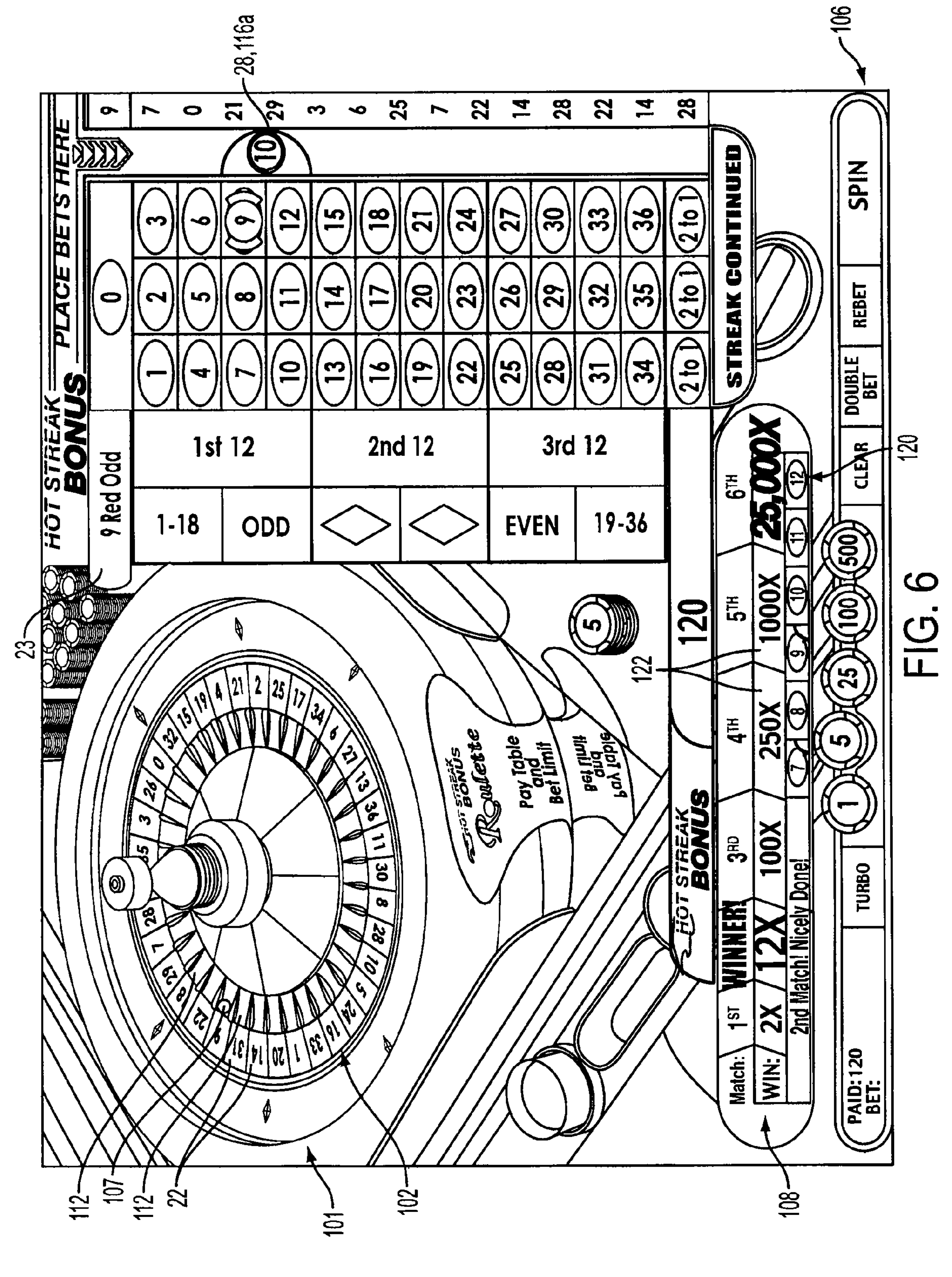
FIG. 6 is a front view of one embodiment of a rotor and wagering station of the game system illustrating the wager placed on the secondary award group of symbols and another of the symbols in the secondary award group being indicated.

FIG. 6 shows the game 100 after a second spin in the additional award opportunity. In the exemplified second spin, the rotor 102 and indicator 107 have indicated the symbol or number "9". The marker 124 is displayed on the indicated symbol or number "9" in the wagering layout 102 to mark which symbol or number was indicated by the rotor 102 during the spin. The $10 wager on the designated wagering area or secondary award group **116*a* carried over from the first spin. Since one of the numbers in the secondary award group 116*a* ("7", "8", "9", "10", "11", and "12") was indicated by the rotor 102 (i.e., "9"), the secondary award group 116*a* remains active, and the game 100** continues the additional award opportunity.

As illustrated, the marker 109 of tracker 108 is displayed adjacent to the completed portion of the secondary award list 120. In this instance, the game system uses the secondary paytable to apply a factor of 12× to the completed portion of the secondary award list (i.e., a second match on the secondary award list) to the $10 wager placed on the designated wagering area or secondary award group 116. The completed portion of the secondary award list 120 and any associated multiplier of the secondary paytable is illuminated or otherwise indicated in another suitable manner. The award reserved at this point in the additional award opportunity is $120 ($10 wager on the secondary award group 116×12), and the dealer holds such award for the player. In one embodiment, the award includes a summation of all of the awards (e.g., $20 and $120) earned at this point during the additional or secondary award opportunity and the dealer holds the summed award for the player. Since the indicated symbol or number "9" was on the secondary award list 120, the dealer provides a third spin for the additional award opportunity in accordance with the game logic 14.

Figure 7:
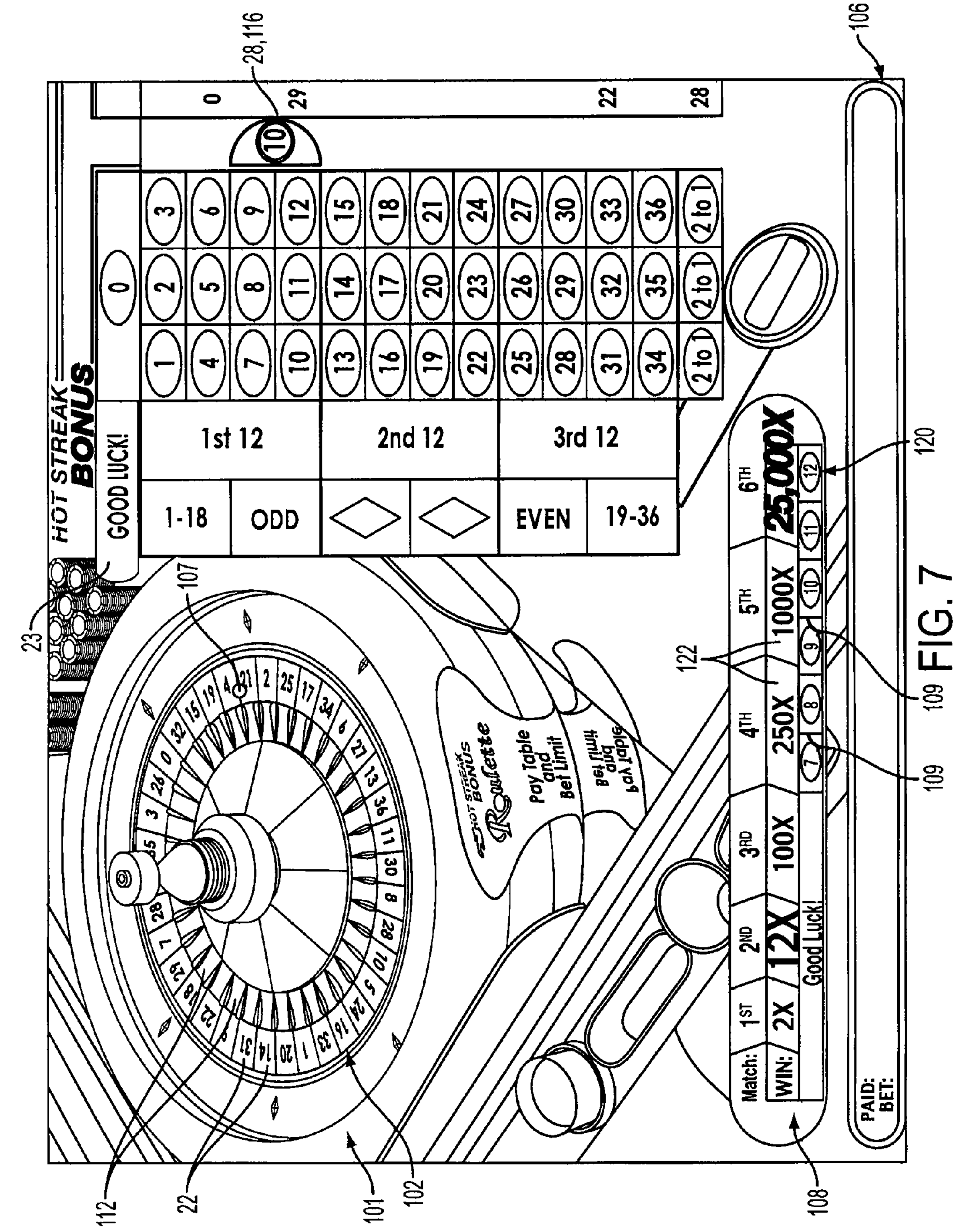
FIG. 7 is a front view of one embodiment of a rotor and wagering station of the game system illustrating the rotor during a spin thereof.

FIG. 7 illustrates the ball or indicator 107 traversing the rotor 102 as the rotor spins during the third spin of the additional award opportunity. The $10 wager on the designated wagering area or secondary award group **116*a* is carried over from the first and second spins. For the additional award opportunity to continue, the rotor 102 must indicate one of the symbols or numbers "7", "8", "9", "10", "11", and "12." In one embodiment, the rotor 102 must indicate one of the symbols or numbers "8", "10", "11", or "12" in the secondary award group 116*a*** (i.e., a number not previously indicated).

Figure 8:
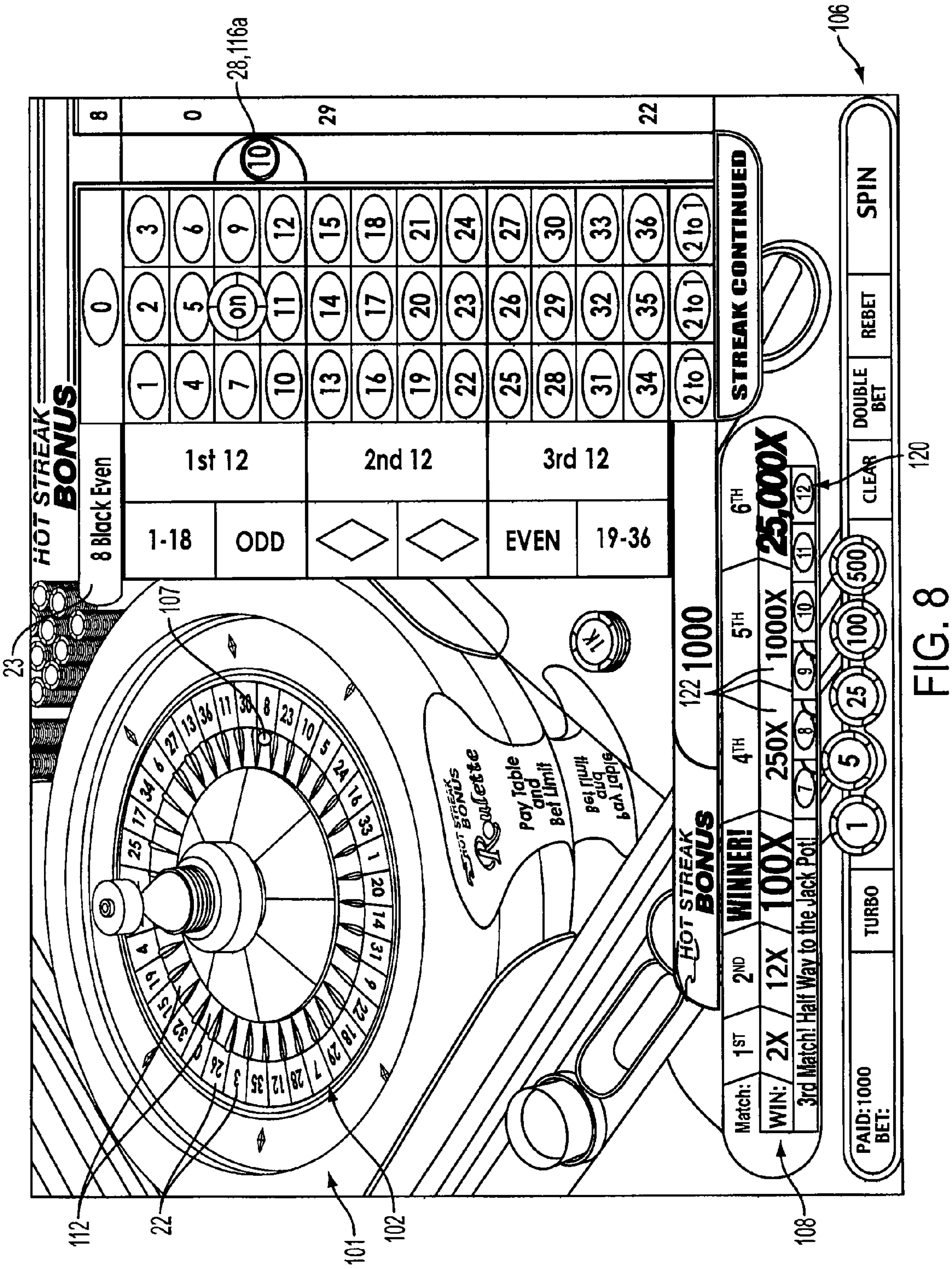
FIG. 8 is a front view of one embodiment of a rotor and wagering station of the game system illustrating the wager placed on the secondary award group of symbols and another of the symbols in the secondary award group being indicated.

FIG. 8 shows the example of the game 100 after the third spin in the additional award opportunity. In the example third spin, the rotor 102 and indicator 107 indicated the symbol or number "8". The marker 124 is displayed on the indicated symbol or number "8" in the wagering layout 102 to mark which symbol or number was indicated by the rotor 102 during the spin. The $10 wager on the designated wagering area or secondary award group 116 carried over from the first and second spins. Since one of the numbers in the secondary award group **116*a* ("7", "8", "9", "10", "11", and "12") was indicated by the rotor 102 (i.e., "8"), the secondary award group 116 remains active, and the dealer continues the additional award opportunity in accordance with the game logic 14**.

The outcome tracker 108 tracks which symbol or number on the secondary award list 120 has been completed. As illustrated, the marker 109 is displayed adjacent to the completed portion of the secondary award list 120. The completed portion of the pattern is associated with one of the award multipliers in the payout schedule 122. In this instance, the completed portion of the pattern (i.e., a third match on the secondary award list) is associated with a third award multiplier in the payout schedule, such as 100×. In one embodiment, the third award multiplier in the payout schedule includes an award modifier of 100× that is multiplied by the $10 wager placed on the designated wagering area or secondary award group 116. The completed portion of the secondary award list 120 and any award modifier associated therewith is displayed or otherwise indicated in another suitable manner. The award won at this point is the additional award opportunity is $1000 ($10 wager placed on the secondary award group 116×100). In one embodiment, the award includes a summation of each award (e.g., $20, $120 and $1000) won at this point during the additional award opportunity, and the dealer provides or reserves the award to the player. Since the indicated symbol or number 8 was on the secondary award list 120, the dealer provides a fourth spin for the additional award opportunity in accordance with the game logic 14.

Figure 9:
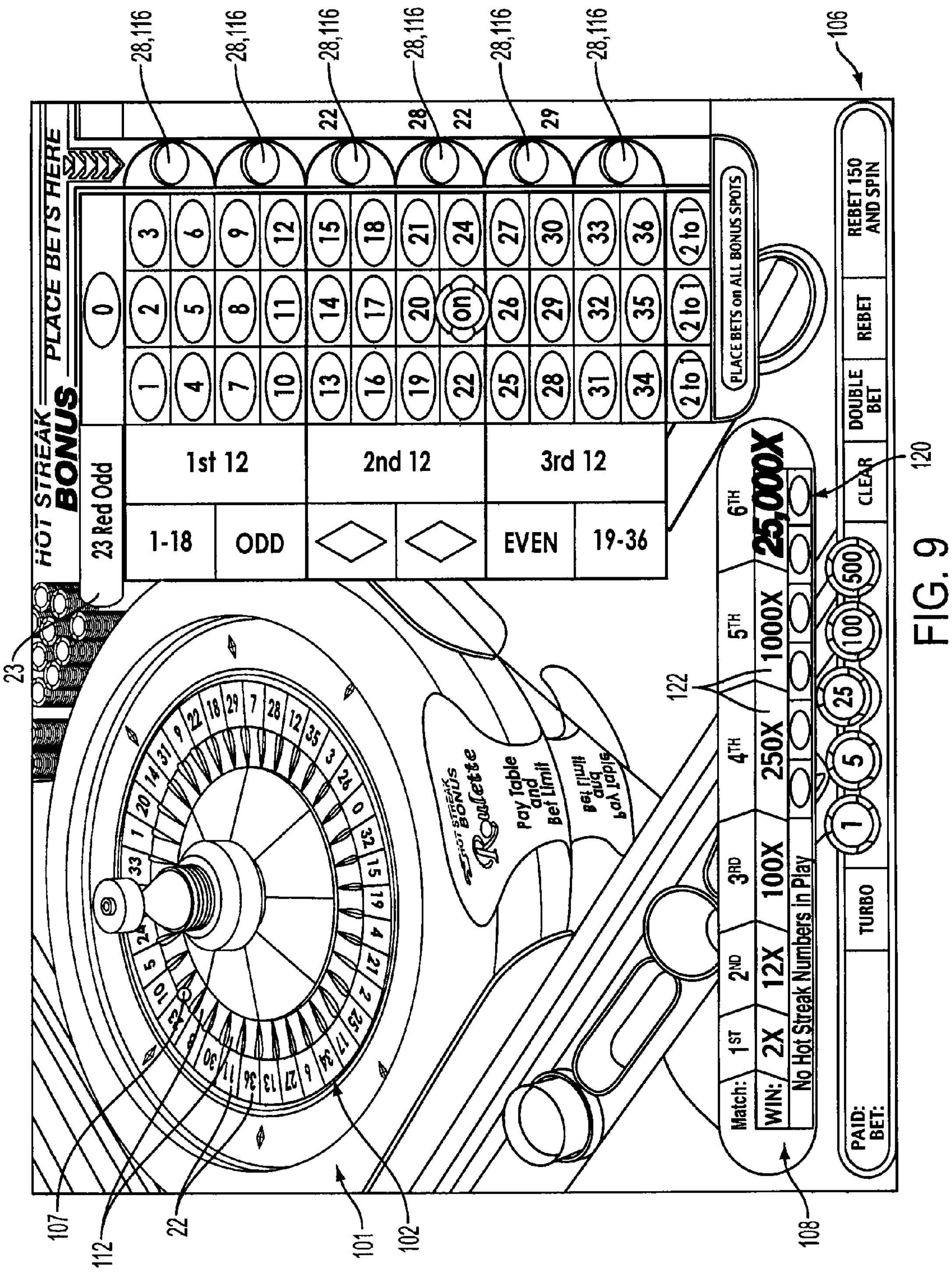
FIG. 9 is a front view of one embodiment of a rotor and wagering station of the game system illustrating the indication of a symbol not included in the secondary award group of symbols.

FIG. 9 shows an example of the game 100 after the fourth spin in the additional award opportunity. In the fourth spin, the rotor 102 and indicator 107 indicated the symbol or number "23". The marker 124 is displayed on the indicated symbol or number "23" in the wagering layout 102 to mark such number "23" as indicated by the rotor 102 during the spin. The $10 wager on the designated wagering area or secondary award group **116*a* was carried over from the first, second and third spins. Since the number "23" is not part of the secondary award group 116*a* (e.g., "7", "8", "9", "10", "11", and "12"), the secondary award group 116*a* is deactivated and the dealer ends the additional award opportunity in accordance with the game logic 14**.

When the additional award opportunity ends, the dealer clears the outcome tracker 108 and the secondary award list 120 and then provides the additional award to the player as a single total award. Additionally, the dealer may inform the players that the designated secondary award groups 116 are available or reactivated (i.e., selectable by a player to place new wagers thereon) to initiate a subsequent additional award opportunity. In the above example, the total award won during the additional award opportunity is $1140. In another embodiment, the player may receive only a single reward for a successfully initiated side bet, based upon how far into the sequence the side bet was able to advance before the sequence terminated.

It should be appreciated that the additional award opportunity can end when a non-secondary award group game outcome is generated or indicated (e.g., 23) as described above. In one embodiment, the additional award opportunity ends when a maximum number of consecutive secondary award group game outcomes is generated or indicated (e.g., six consecutive occurrences of any of the numbers "7", "8", "9", "10", "11", and "12"). The additional award opportunity may also end when each game outcome in the secondary award group is generated or indicated consecutively (e.g., all of the numbers "7", "8", "9", "10", "11", and "12"). In one instance, if the rotor 102 indicates the symbols or numbers "7", "8", "9", "10", "11", and "12" in any order and in any sequence, the outcome tracker 108 tracks the secondary award list 120 as completed. The successfully completed secondary award list 120 is associated with a relatively large or jackpot award modifier of 25,000×. In another embodiment, the successfully completed secondary award list 120 is associated with a progressive award.

In the example described above, the outcome tracker 108 tracks the indication of symbols through use of the secondary award list 120 associated with an active secondary award group 116 for consecutive spins of the rotor 102. In one embodiment, a secondary award group 116 remains active for a designated quantity of spins. For example, if the designated quantity of spins is one, a number on the secondary award list must be indicated in consecutive spins for the secondary award group 116 to remain active (i.e., to continue the additional award opportunity). In another example, if the designated quantity of spins is three, a number on the secondary award list must be indicated within every three spins for the secondary award group 116 to remain active (i.e., to continue the additional award opportunity).

In one embodiment, the additional award opportunity continues as long as the rotor spins result in the indication of symbols on the secondary award list 120 associated with the selected secondary award group 116. In one embodiment, the secondary award list 120 includes the indication of any symbol 22 in the secondary award group 116. In one embodiment, the secondary award list 120 specifies the indication of the symbols 22 in the secondary award group 116 in a particular order, such as a designated sequential or consecutive order. In another embodiment, the secondary award list 120 specifies the indication of any unique or non-repeating symbol 22 in the secondary award group 116 in no particular order.

If one of the predetermined conditions are not satisfied, the player loses the wager placed on the secondary award group 116, and the additional award opportunity ends. Any awards accumulated during the additional award opportunity are provided to the player. In one embodiment, the additional award opportunity ends after all of the symbols 22 in the secondary award group 116 are indicated. In this instance, the player may be provided the wager associated with the secondary award group 116 in addition to any awards won during the additional award opportunity. In one embodiment, the award system 18 continues the additional award opportunity only as long as designated types or ones of the symbols of a secondary award group 116 are indicated, such as in a designated order. For example, the system 18 may require the consecutive indication of symbols x, y and z in such order. If symbol x is indicated first, the system 18 provides or reserves an award. If symbol z is indicated second, the additional award opportunity terminates.

In one embodiment, the dealer provides an award to the player if one of the following predetermined conditions are satisfied: (i) any of the numbers 22 in the secondary award group 116 are indicated, (ii) at least two numbers 22 are indicated sequentially in the secondary award group 116, or (iii) at least two of the numbers 22 in the secondary award group 116 are indicated in a designated pattern. The award is based on the secondary paytable 32 and an amount of the wager 26 on the selected secondary award group (as described above in reference to FIG. 1) In an example of one embodiment, the secondary paytable 32 includes:

| Unique Numbers Indicated | Award Increaser (× is a modifier or multiplier) |
|---|---|
| $1^{st}$ | 2× |
| $2^{nd}$ | 12× |
| $3^{rd}$ | 100× |
| $4^{th}$ | 250× |
| $5^{th}$ | 1000× |
| $6^{th}$ | 25,000× (plus optional return of original bet) |

In one embodiment, the maximum award may be capped to a specific monetary amount irrespective of the wager amount. For example, the maximum award could be defined to be $250,000 so that if a player made a $25 secondary bet, a $6^{th}$ level award would be limited to $250,000 instead of $625,000 that a 25,000× multiplier would have yielded without said maximum award cap. In another embodiment, the maximum award may be progressive jackpot. In another embodiment, a plurality of different progressive jackpot amounts could be available.

In one embodiment, if the same number 22 is indicated more than one time (i.e., duplicates or repeats) in the secondary award group 116 during the additional award opportunity, the dealer enables the player to continue the additional award opportunity in accordance with the game logic 14. In this instance, the dealer may or may not provide the player an award based on an award multiplier in the payout schedule and spins the rotor again. For example, if the same number 22 in the secondary award group 116 is indicated on the first and second spins of the rotor 102 during the additional award opportunity, the dealer provides or reserves an award based on a first award multiplier in the payout schedule (2×) based on the first spin and an additional spin (i.e., a third spin of the rotor 102) based on the second spin. In one embodiment, the additional spin is provided without any other primary wagers. In one embodiment, the dealer provides or reserves an award for the second spin, wherein the award is associated with a different award multiplier in the payout schedule (e.g., 12×) for a duplicate or repeated number 22 being indicated in the secondary award group 116 during the additional award opportunity versus an unique number 22 being indicated in the secondary award group 116.

In one embodiment, the dealer does not provide the player with an award based on the award multiplier if the same number 22 is indicated more than one time (i.e., duplicates or repeats) in the secondary award group 116 during the additional award opportunity. In one alternative embodiment, the dealer reactivates the number 22 in the additional award opportunity so that if the number 22 is indicated by the rotor (i.e., duplicates or repeats) in a subsequent spin, the dealer can provide the player with an award based on one of the award multipliers. In this embodiment, a first indication of the number 22 in the secondary award group causes the dealer to provide an award to the player, a second indication of the number 22 in the secondary award group causes the dealer to spin the rotor again without providing an award to the player and a third indication of the number 22 causes that number to be reactivated. For a fourth spin of the rotor, if the number 22 is indicated, the dealer provides the player with an award (e.g., like the first indication of the number). This configuration enables a player to receive an award for the indication of the same number 22 during the additional award sequence.

In another embodiment, the system enables the player to place a secondary bet that pays the player relative to how the player's secondary wager progressed. Here, the player may receive only a single award which varies with how far the player advances before termination in accordance with a suitable payout schedule or paytable.

Mechanical and Electro-Mechanical Embodiments

Figure 10:
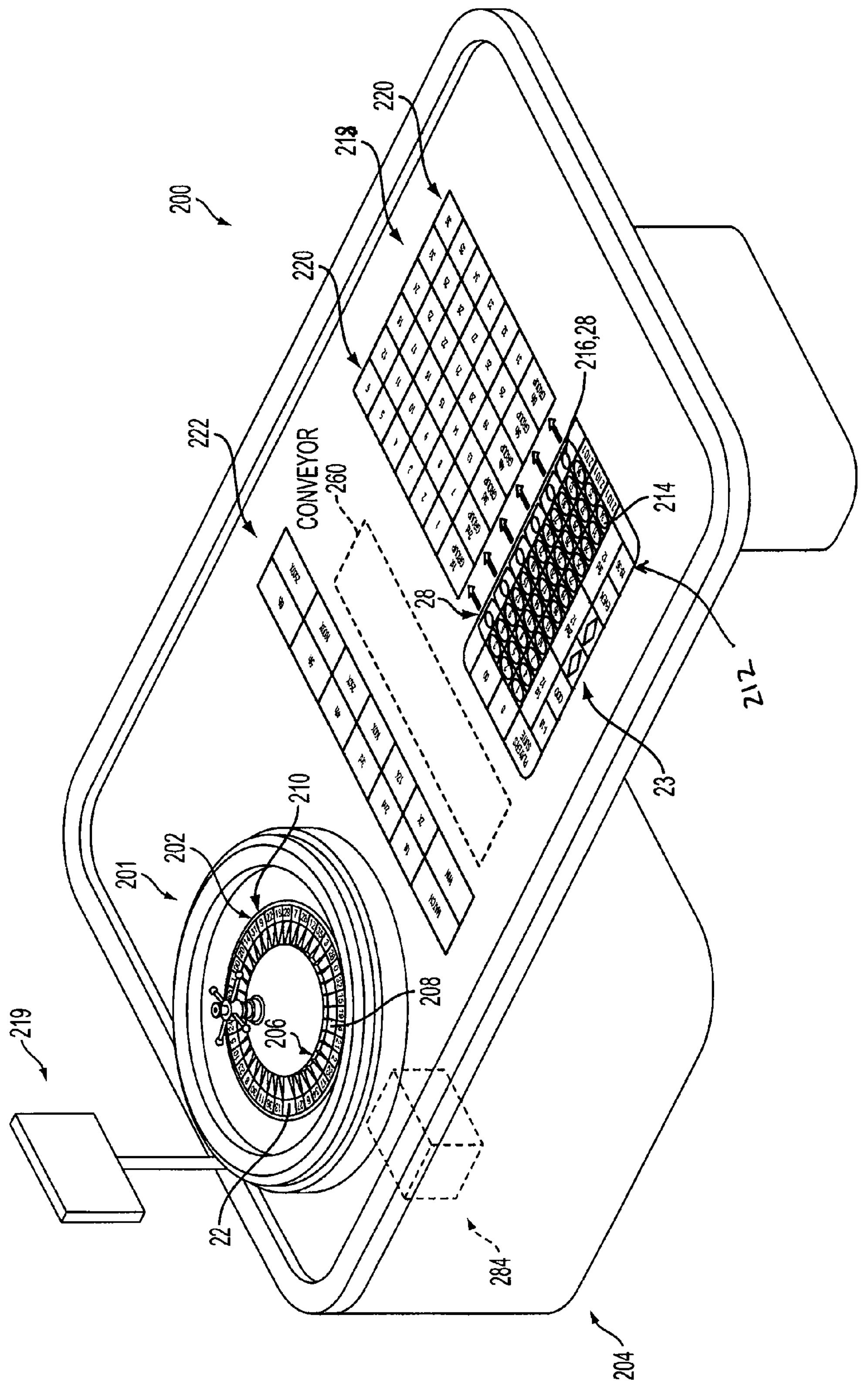
FIG. 10 is a perspective view of one embodiment of a game system.
Figure 11:
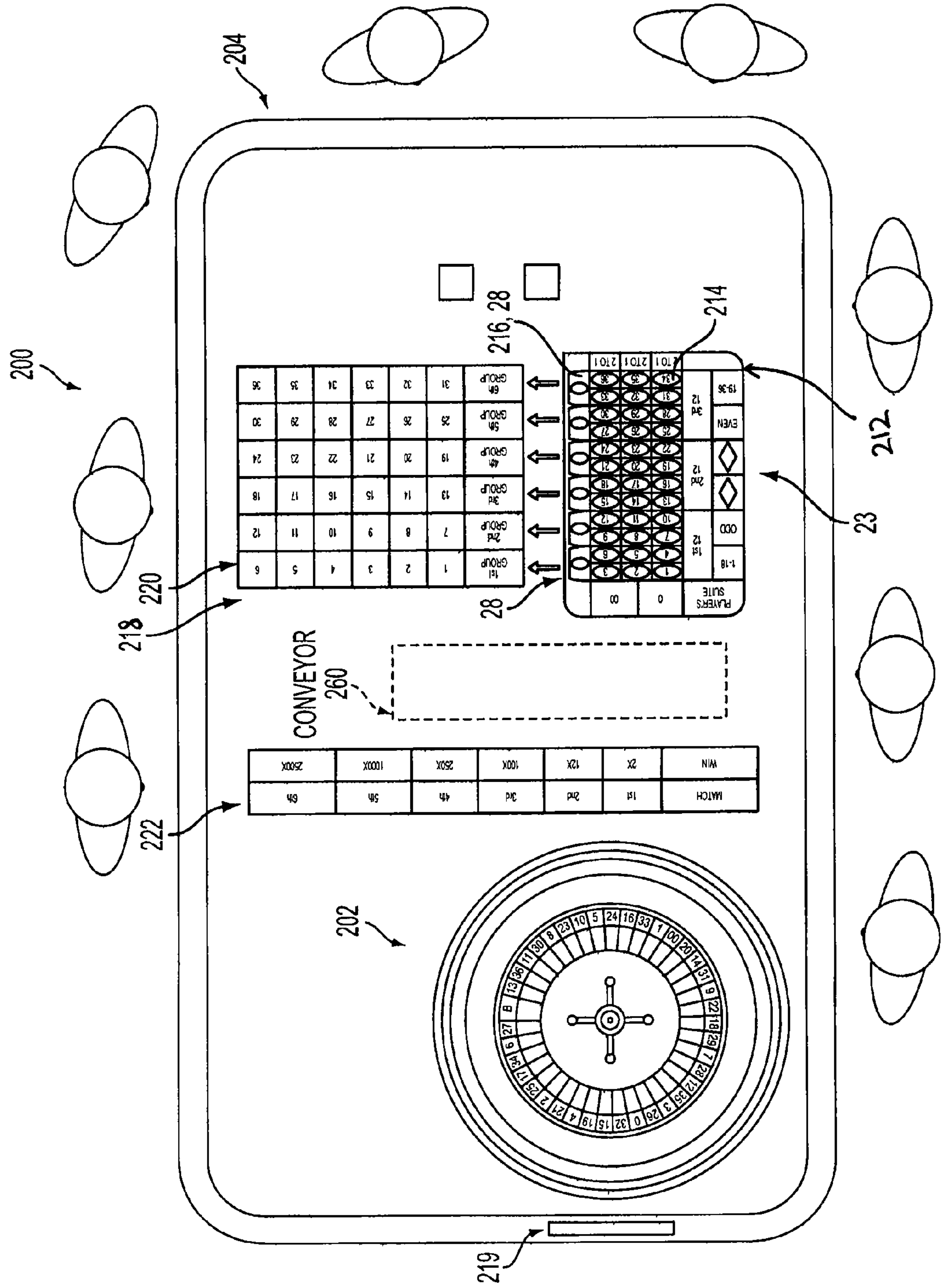
FIG. 11 is a side elevation and diagrammatic view of the game system of FIG. 10.

Referring to FIGS. 10 and 11, one embodiment of the rotor-based game system 10 is embodied in a gaming device 200 in a mechanical form. The gaming device 200 includes a wheel assembly 201 having a rotor 202. The wheel assembly 201 is supported by support structure 204 in the form of a gaming table or other suitable support. In one embodiment, the rotor 202 includes: (a) an inner circular section 206 which carries a series of game or ball landings 208 and (b) an outer circular section 210 which encircles the inner circular section 206 and which includes a plurality of game symbols 22. In one embodiment, each game landing 208 is aligned with a game symbol 22. Because, in one such embodiment, the inner circular section 206 and outer circular section 308 are formed as part of the same rotor 202, the sections 206 and 210 do not move relative to one another. One or more players can wager on which game symbol 22 and game landing 208 will be indicated on each spin of the rotor 202 via a wagering station 212.

In one embodiment, the rotor 202 includes one or more detectors or landing sensors (not shown), which are operable to automatically sense whether the ball has landed in a game landing 208. The landing sensors can include any suitable sensing apparatus which generates a signal when the ball lands in a landing, including, but not limited to, a light sensor, a motion detector and a pressure sensor.

The landing of a ball on a game landing 208 results in a primary game outcome associated with the bets placed on the wagering station 212. In this embodiment, the wagering station 212 includes the same betting layout as described above in reference to the wagering station 102. The betting layout includes a template which specifies a grid of numbers and betting options. The numbers in the grid correspond to the numbers in the rotor 202. The players place their betting markers or chips on desired locations on the wagering station 212 in the manner described above, where each said location corresponds to one or more specific numbers and, whose corresponding payout is based upon the count of numbers covered by said location.

A chip router 284 may be located underneath the wagering station 212 to direct chips or tokens from the top of the wagering station 212 to a designated location or player. The chip router 284 is described in greater detail below with reference to FIG. 15.

In this embodiment, the wagering station 212 is accessible by a plurality of players simultaneously. As shown in FIG. 11, the players may stand or sit adjacent to the rotor 202 and/or the wagering station 212. Players place wagers on various wagering areas associated with the wagering station 212. A human dealer controls the operation of the rotor or wheel assembly 202. Once the rotor 202 results in an outcome for the primary game (i.e., indicates one of the symbols or numbers), the embodiment illustrated in FIGS. 10 and 11 operates identical to or substantially identical to the embodiment illustrated in FIGS. 3 to 9. Although the operation is substantially identical, the wagering options and outcome tracking will be performed by a human dealer in accordance with the wagering station or layout 212.

Figure 12A:
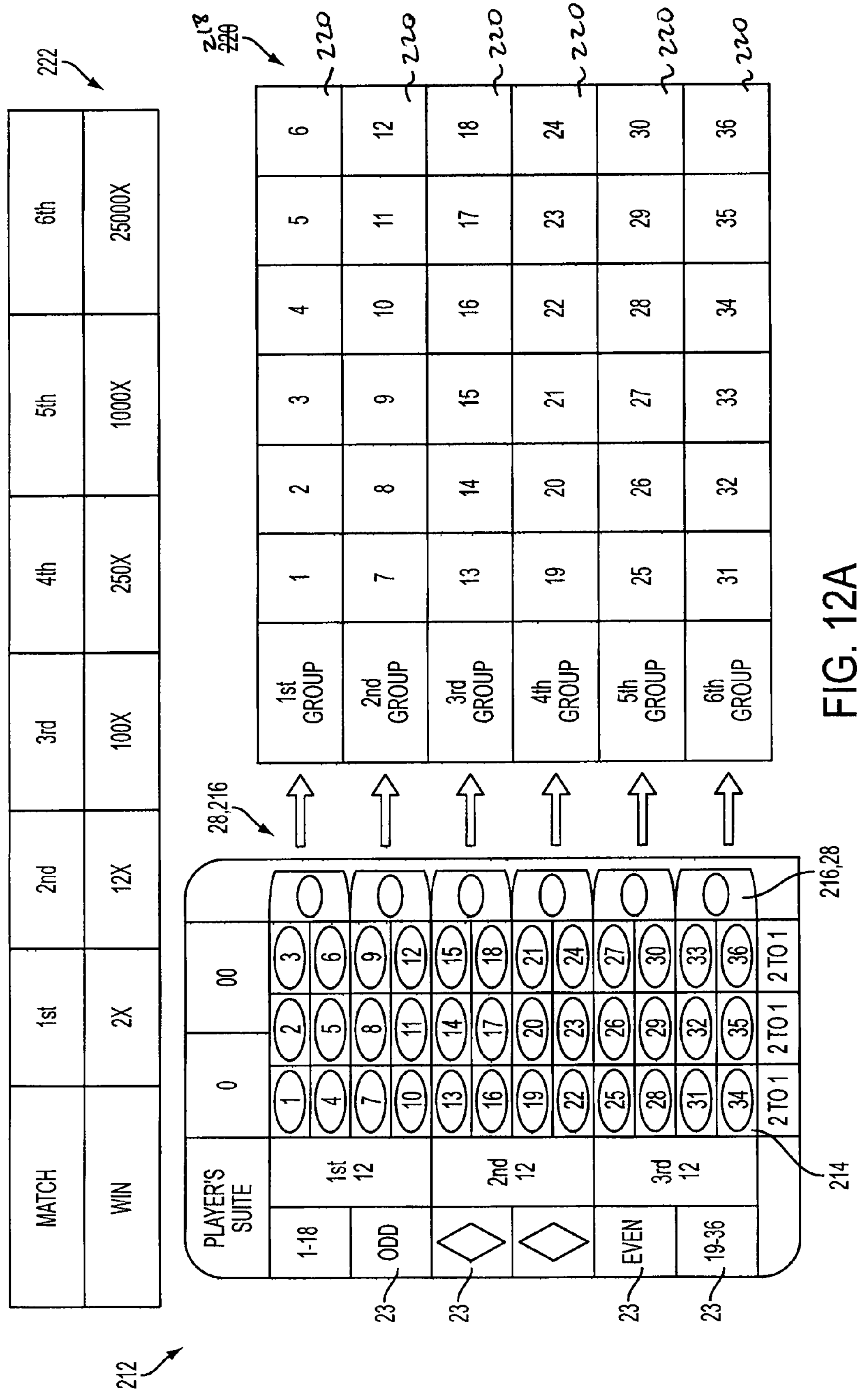
FIG. 12A is a table of an example wagering station for one embodiment of the game system.

As illustrated in FIGS. 10, 11 and 12A, the wagering layout 212 includes a plurality of wagering regions 214. In this embodiment, the wagering regions 214 constitute a template of a grid of numbers and betting options. To play the Roulette game, one or more players place wagers on at least one wagering region 214 of the wagering layout 212. The wagering layout 212 indicates any placed wagers on the one or more wagering regions 214 with a suitable marker, such as at least one chip or token having a designated or desired denomination. Each player can control the risk and potential award levels by selecting one or more of the wagering regions 214 and a wager denomination.

At least one of the wagering regions 214 is designated as a designated wagering region or secondary award group 216. Each designated wagering region 216 represents an additional wagering opportunity for the player. This additional wagering opportunity enables the player to play for increased awards. As illustrated in FIGS. 10, 11 and 12, the designated wagering regions 216 may constitute a plurality of player selectable secondary award groups of the symbols 22. The secondary award groups 216 include a designated number of the symbols 22. In one embodiment, the designated number is one, six or any other suitable number. Accordingly, the designated wagering regions or secondary award groups 216 are each associated with at least one, or a plurality, of the symbols 22.

Upon the placement of a wager on the wagering station 212, the dealer causes the rotor 202 and an indicator, such as a ball or other suitable marker, to spin. When the indicator stops spinning, the indicator indicates an outcome of the rotor spin. If the outcome corresponds to a winning outcome (i.e., matches an outcome wagered on by the player), the human dealer provides an award to the player based on the placed wagers.

An outcome tracker 218 is operable with the wagering station 212 to track the outcomes. If the tracked outcomes correspond to a designated secondary award list of the secondary award group 216, the human dealer designates an award for a winning player and either: (a) provides that award to the winning player, or (b) reserves that award for the winning player. The outcome tracker 218 is associated with the rotor 202, the wagering regions 214 and the designated wagering regions or secondary award groups 216. The outcome tracker 218 is operable to track the sequential indication of each symbol 22 indicated by the rotor 202 for each spin thereof. In one embodiment, the outcome tracker 218 is associated with an electronic outcome display 219. The outcome display 219 is operable to electronically display a history of the tracked outcomes for each spin of the rotor 202. The outcome display 219 may be in the form of a display screen or board as shown in FIG. 10.

The outcome tracker 218 also includes a pattern 220 of the symbols 22. The pattern 220 is associated with a secondary award group **216*a* that is selected by a player. The selected secondary award group 216*a* defines the secondary award list 220. The symbols on the secondary award list are occurable in association with a plurality of spins of the rotor 202. The outcome tracker 218 further includes a plurality of award multipliers 222, each being operable to track whether the symbol indicated by the rotor 202 for each spin thereof corresponds to the secondary award list 220. If the indicated symbol is on the secondary award list 220, the human dealer provides or reserves an award to the player based on one of the award multipliers 222. For example, for a first match within the pattern 220, an award multiplier such as 2×, is used to modify the award provided to the player. For a second match on the secondary award list, another award multiplier such as 12×, is used to modify the award provided to the player. In this instance, the player continues the additional award opportunity in an attempt to match another indicated symbol to the pattern 220. In one embodiment, each time a secondary award listed symbol is indicated, the award multipliers 222 determine an increased award value or modifier until a non-listed symbol is indicated. If a secondary award listed symbol is indicated twice, no match is recognized, the award multiplier 222 does not change, and the dealer spins the rotor 202** again.

To track the wagers on particular secondary award groups 216, the matches on the secondary award list 220 and any associated award multipliers 222, the human dealer places a designated marker, such as a token or chip, associated with each player on the wagering layout 212. Each designated marker may be associated with different players through color or some other suitable identifying characteristic.

In one embodiment, this process continues until the first of the following termination conditions is met: (a) a maximum number of matches occur (i.e., each symbol on the applicable secondary award list is matched), wherein the player's wager on the secondary award group 216 is multiplied by a maximum or top-level award multiplier (e.g., such as 25,000× shown in FIGS. 10, 11 and 12); or (b) a symbol not in the secondary award group 116) is indicated the rotor 202.

Figure 12B:
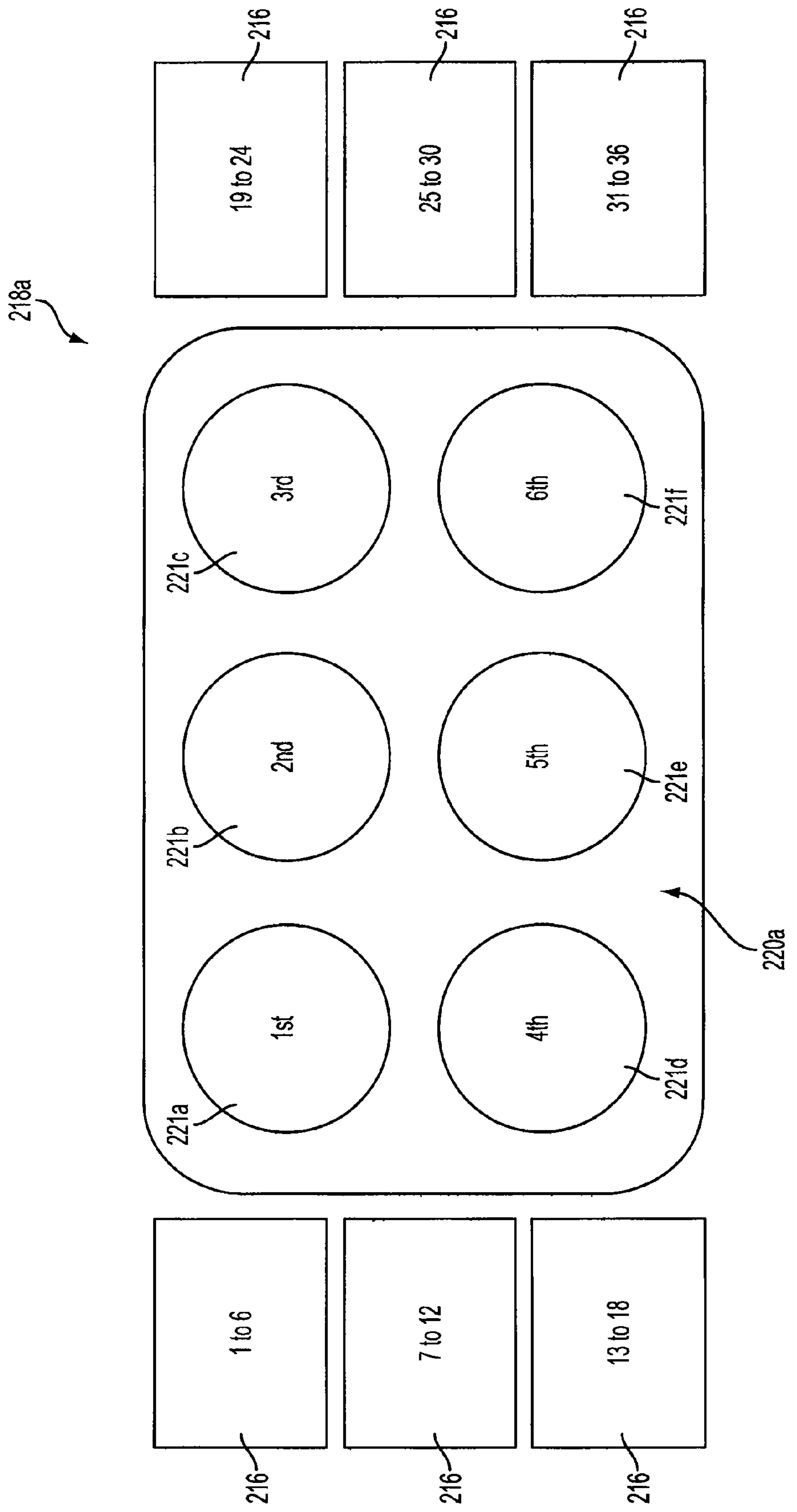
FIG. 12B is a table of an example outcome tracker for one embodiment of the game system.

Referring to FIG. 12B, the gaming device 200 can include another embodiment of the outcome tracker 218 associated with the wagering layout 212. As illustrated, in FIG. 12B, outcome tracker 218*a* is another embodiment of the outcome tracker 218. The outcome tracker 218*a* is associated with the wagering layout 212 which includes the wagering regions 214 and the secondary award groups 216. In this embodiment, the outcome tracker 218*a* displays the secondary award groups 216 and a pattern or secondary award list of symbols 220*a* in those secondary award groups 216. The outcome tracker 218*a* indicates any wagers placed on those secondary award groups 216 and which symbols (e.g., a first symbol 221*a*, a second symbol 221*b*, a third symbol 221*c*, a fourth symbol 221*d*, a fifth symbol 221*e* or a sixth symbol 221*f*) is or has been indicated in one of the those secondary award groups 216.

The outcome tracker 218*a* is operable with the wagering station 212 to track the outcomes of the rotor 202. If the tracked outcomes correspond to a symbol or number in the designated secondary award list or pattern 220*a* of the secondary award group 216, the dealer designates and provides or reserves an award for a winning player. In one embodiment, the outcome tracker 218*a* is operable to track the sequential indication of each symbol 22 indicated by the rotor 202 for each spin thereof.

As illustrated in FIG. 12B, in one embodiment, the symbol area 220*a* of the tracker 218*a* is, at any one point in time, used exclusively in conjunction with a single one of the secondary award groups 216. Depending upon which secondary award group 216 is active for a given sequence, the symbol area 220*a* is active for such secondary award group 216 and inactive for the remaining secondary award groups 216. For example, if a group A of players bet on a first secondary award group (e.g., "1 to 6"), the secondary award list or area 220*a* is available to sequentially indicate any symbols which might be hit within that first secondary award group. If, at the same time player group A placed its bet, a group B of players bet on a second secondary award group (e.g., "7 to 12"), the secondary award list or area 220*a* is available to sequentially indicate any symbols which might be hit within that second secondary award group. In this fashion, the area 220*a* serves different secondary award groups 216 at different times depending upon which secondary award group 216 is active for the additional or secondary award opportunity of the system.

The outcome tracker 218*a* is operable with the wagering station 212 to track the outcomes of the rotor 202. If the tracked outcomes correspond to a symbol or number in the designated secondary award list or pattern 220*a* of the secondary award group 216, the dealer designates and provides or reserves an award for a winning player. In one embodiment, the outcome tracker 218*a* is operable to track the sequential indication of each symbol 22 indicated by the rotor 202 for each spin thereof.

Upon the placement of a wager on one of the secondary award groups 216 on the wagering layout 212, the dealer causes the rotor 202 and the indicator to spin. When the indicator stops spinning, the indicator indicates an outcome of the rotor spin. If the outcome corresponds to a winning outcome (i.e., matches an outcome wagered on by the player), the dealer provides an award to the player based on the placed wagers. If the outcome corresponds to one of the secondary award groups 216, the dealer moves the placed wager to the associated secondary award group 216 of the outcome tracker 218*a*. For example, one of the secondary award groups 216 includes the numbers "7", "8", "9", "10", "11" and "12". If the number "7" is indicated by the rotor, and the player placed a wager on the secondary award group 216 that includes that number "7" the dealer moves the placed wager from the original bet area (not shown) to the secondary award group "7 to 12" of the outcome tracker 218*a*. The secondary award group "7 to 12" of the outcome tracker 218*a* is the designated or active secondary award group 216.

Once the wager (i.e., a betting chip or other suitable marker indicating the previously placed wager) is moved to the active secondary award group 216 of the outcome tracker 218*a*, the dealer marks which number 22 in the active secondary award group 216 was indicated by the rotor 202. Based on the above example, the dealer marks the first symbol or number 221*a* of the active secondary award group 216. In one embodiment, the dealer marks the first symbol 221*a* with a lamer, betting chip or any other suitable marker. In a traditional roulette application, each player uses a different, player-specific color of betting chip. The betting chips on the outcome tracker therefore indicate which player is to receive any corresponding awards.

The symbols 221*a*, 221*b*, 221*c*, 221*d*, 221*e*, and 221*f* in the secondary award list 220*a* are occurable in association with a plurality of spins of the rotor 202. The outcome tracker 218*a* is associated with a paytable that defines a plurality of award increasers or multipliers 222, as described above. A different award multiplier 222 is associated with each of the symbols 221*a*, 221*b*, 221*c*, 221*d*, 221*e*, and 221*f* in the secondary award list 220*a*. If the indicated symbol is on the secondary award list 220*a*, the dealer provides or reserves an award to the player based on one of the award multipliers 222. For example, for a first match within the pattern 220*a*, an award multiplier, such as 2×, is used to modify the award provided to the player. Based on the above example, an indication of the symbol "7" is associated with a first award multiplier, such as 2×, because it was the first match within the pattern 220*a*. For a second match on the secondary award list, another award multiplier, such as 12×, is used to modify the award provided to the player. In this instance, the player continues the additional award opportunity in an attempt to match another indicated symbol to the pattern 220*a*. In one embodiment, each time a secondary award listed symbol is indicated, the award multipliers 222 determine an increased award value or modifier until a non-secondary award listed symbol is indicated. If a secondary award listed symbol is indicated twice, no match is recognized, the award multiplier 222 does not change, and the dealer spins the rotor 202 again.

In one embodiment, this process continues until the first of the following termination conditions is met: (a) a maximum number of matches occur (i.e., each symbol 221*a*, 221*b*, 221*c*, 221*d*, 221*e* and 221*f* on the applicable secondary award list 220*a* is matched), wherein the player's wager on the secondary award group 216 is multiplied by a maximum or top-level award multiplier (e.g., such as 25,000×); or (b) a symbol not on the secondary award list (i.e., not in the secondary award group 216) is indicated on the rotor 202. Upon the termination condition being met, the dealer clears all wagers from the outcome tracker 218*a* and enables players to wager on one of the plurality of secondary award groups 216 on the wagering layout 212 as described above.

Figure 13:
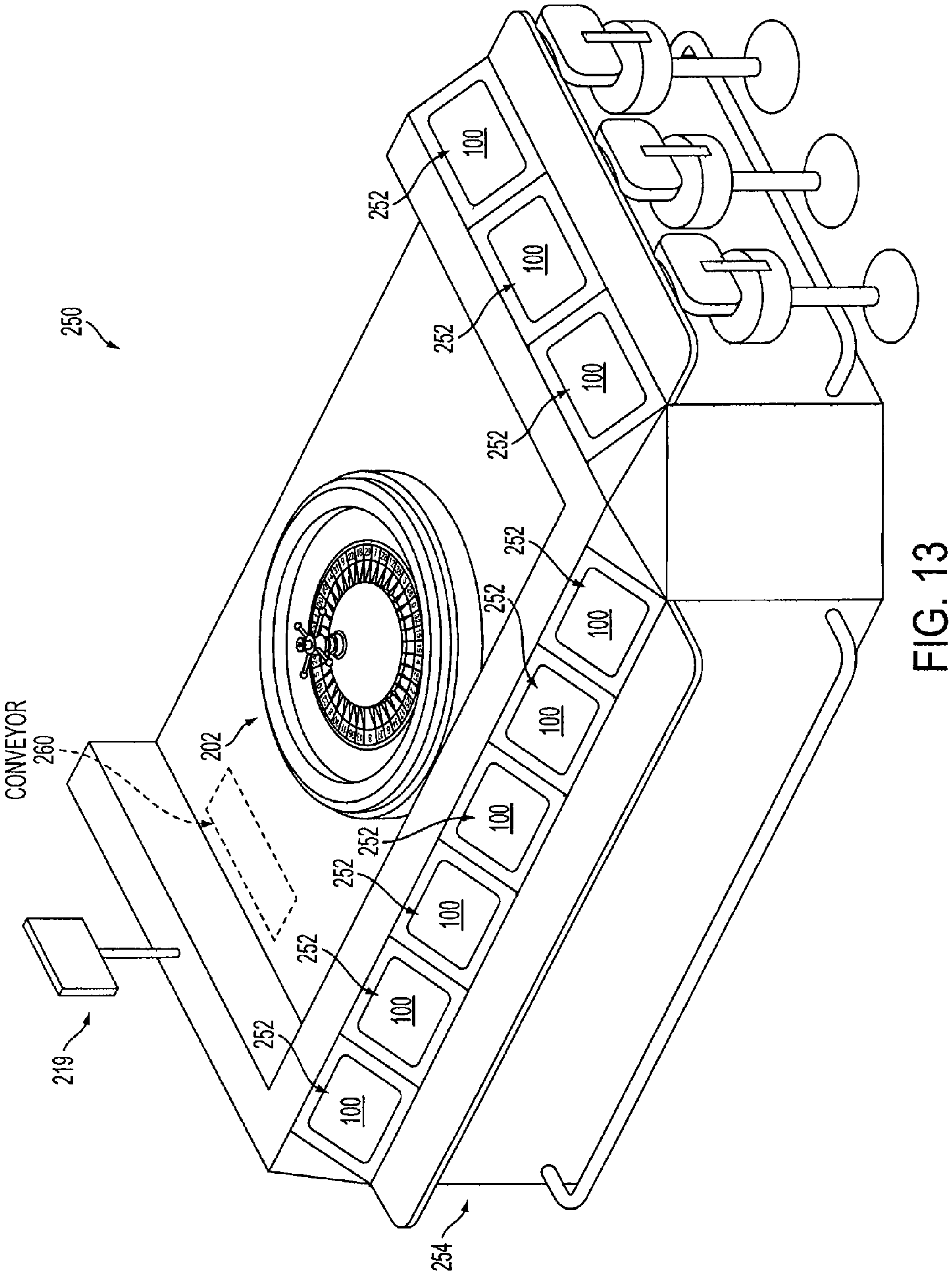
FIG. 13 is a perspective view of one embodiment of a game system.
Figure 14:
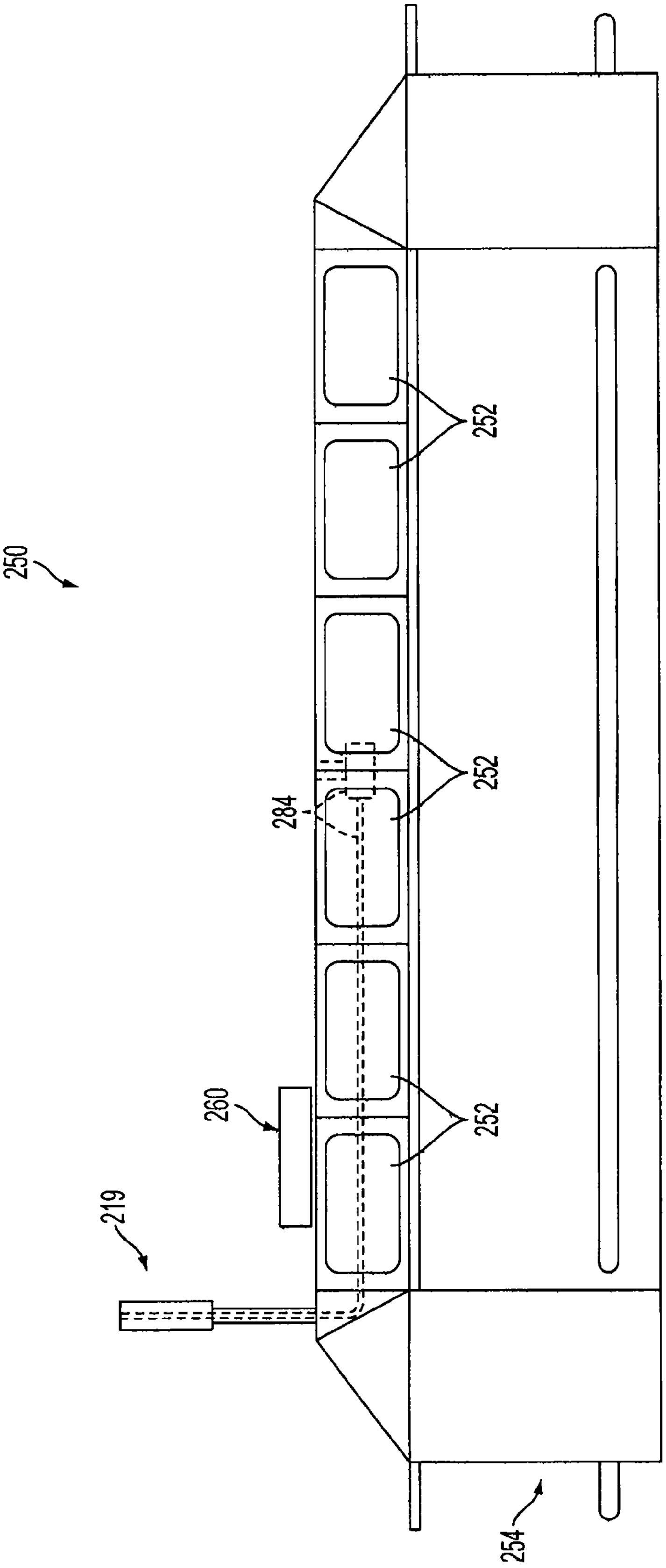
FIG. 14 is a side view of the game system of FIG. 13.

In another embodiment illustrated in FIGS. 13 and 14, the game system 10 is embodied in an electromechanical gaming device 250. The gaming device 250 includes the mechanical rotor 202 described above and a plurality of display devices 252 that, when activated, display a computer-generation of the game 100 described above. The plurality of display devices 252 are supported by a support structure 254. The support structure 254 enables one or more players to view and operate the display devices 252. Each graphical wagering station or layout displays the game 100 and enables a player to select desired numbers 22, secondary award groups 216 and betting combinations for their wagers. In one embodiment, both a standard table layout and computer-generated wagering stations can share the same rotor 202. In each such embodiment, after the players have placed their bets, the dealer operates the rotor 202 resulting in an outcome for the primary game, as described above in accordance with the game logic 14.

Once the rotor 202 results in an outcome for the primary game (i.e., indicates one of the symbols or numbers), the embodiment illustrated in FIGS. 13 and 14 operates identical to or substantially identical to the embodiment illustrated in FIGS. 3 to 9. As described above, in one embodiment, indicated symbols 22 can be displayed by the outcome display 219.

Figure 15:
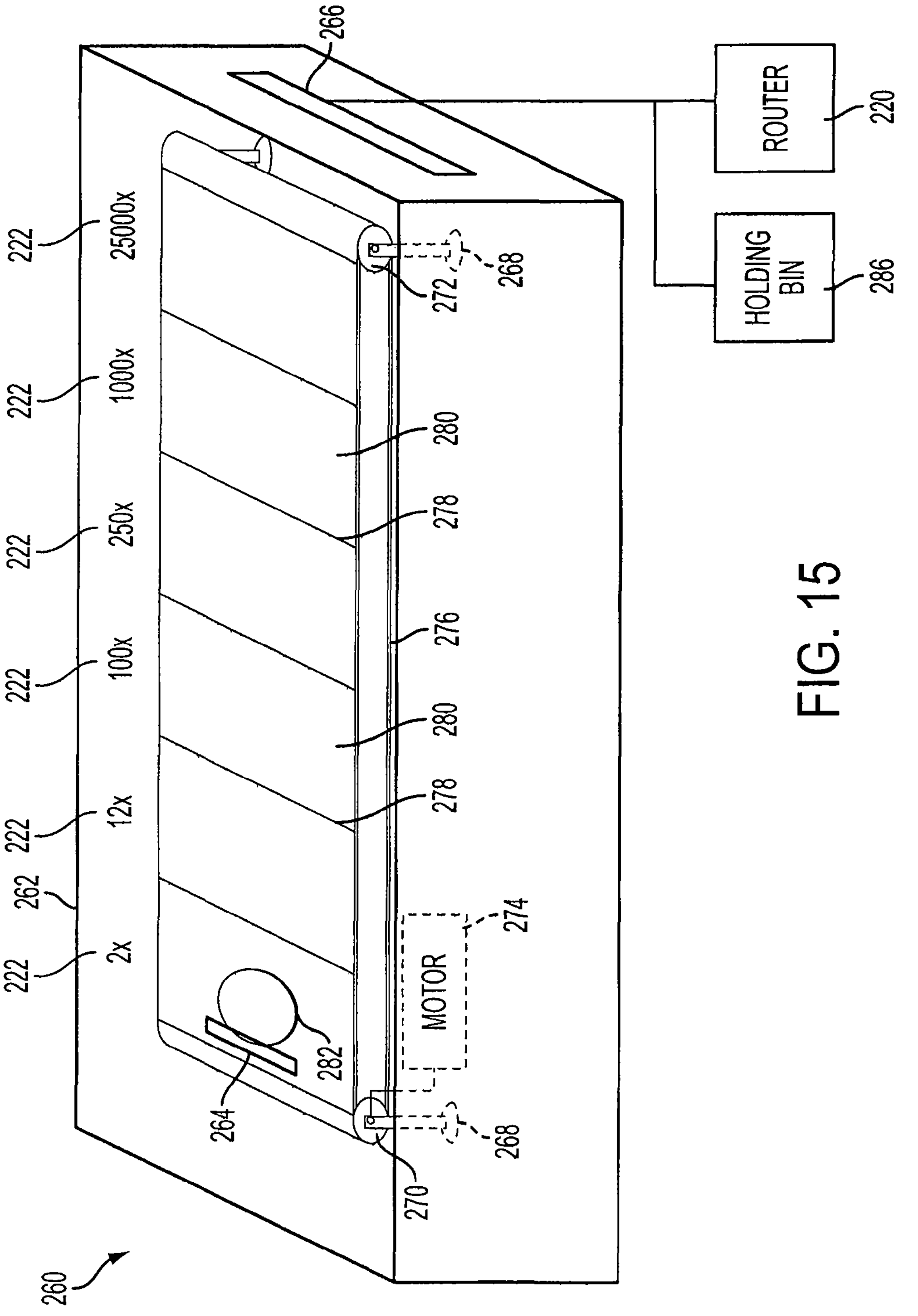
FIG. 15 is a perspective view of one embodiment of a chip transporter for one embodiment of the game system.

Referring to FIG. 15, in one embodiment, gaming devices 200 and 250 each include a chip transporter or conveyor assembly 260 that may be implemented in either mechanical or electro-mechanical form. The chip transporter 260 operates to produce a demonstration or exhibition of the functions of the outcome tracker 108. In one embodiment, the chip transporter 260 includes a lockable cover or casing 262, which may be a substantially clear plastic material or other substantially transparent or translucent material. The casing 262 has a chip receiving slot or input 264 and a chip chute or output 266.

The chip transporter 260 includes a frame 268. The frame 268 is attached to a support structure, such as a gaming table or gaming device, for operation with the rotor-based game system 10. The frame 268 supports at least two rotatably mounted rollers 270 and 272. The rollers 270 and 272 are coupled to a motor 274, which is operable to cause the rollers 270 and 272 to rotate in the same direction. A transporting or conveyor track 276 is endless and movably supported by the rollers 270 and 272 so that as the rollers 270 and 272 rotate, the transporting track 276 moves in the direction of rotation of the rollers 270 and 272. In one embodiment, the motor 274 is configured to cause the rotation of the rollers 270 and 272 after a dealer or player input (e.g., through a suitable input device). In another embodiment, the motor 274 is configured to cause the rotation of the rollers 270 and 272 automatically after one of the landing sensors described above sense whether the ball has landed in a certain ball landing of the rotor 202.

The transporting track 276 includes a plurality of dividers or dividing members 278 that separate different portions 280 of the transporting track 276. In one embodiment, the dividing members 278 are integral to the track 276. In one embodiment, the dividing members 278 are retaining walls fixedly secured to the track 276 via fasteners, adhesive, bonding or any other suitable securing member. Each separate portion 280 of the transporting track 276 corresponds to one of the award multipliers 222 described above. As illustrated, the leftmost portion 280 of the track 276 corresponds to a first award multiplier (e.g., the award multiplier of the lowest amount, such as 2×) and the rightmost portion 280 of the track 276 corresponds to a second award multiplier (e.g., the award multiplier of the highest amount, such as 25,000×).

In one embodiment, the award multipliers 222 are displayed adjacent to the transporting track 276 so that as the track 276 moves, the separate portions 280 thereof correspond to one of the award multipliers 222. For example, if a chip 282 is located at the leftmost portion 280 of the track 276, the chip 282 represents a player's qualification for a first award multiplier 222. As illustrated, the first award multiplier has a value of 2×. When the track 276 moves about the rollers 270 and 272, the track moves the chip 282 next to a second award multiplier 222. As illustrated, the second award multiplier has a value of 12×. In this manner, the conveyor 260 represents an award escalator or ladder that tracks and indicates escalating award multipliers 222 for the player.

In operation of the rotor-based game system 10 described above, after an indication of a first symbol 22 in a secondary award group 28 wagered on by a player, the dealer or the player places the chip 282 into the chip input 264. The chip input 264 receives the chip 282. The chip input 264 is configured to direct the chip 282 to the leftmost portion 280 of the track 276. As described above, the leftmost portion 280 of the track 276 corresponds to a first award multiplier 222. As illustrated, the first award multiplier 222 has a value of 2× and is the lowest award multiplier available to the player. It should be appreciated that chips associated with different players may be represented with different colors or a designated marker or other indicator associated with each player may be used instead of chips.

When the chip 282 advances next to one of the award multipliers 222 (e.g., based on an outcome indicated by the rotor), the dealer provides the player with an award based on that award multiplier 222. For example, when the chip 282 advances to the first award multiplier 222, the dealer provides the player with an award including any wager on the secondary award group 28 modified by the first award multiplier 222 (2×). In one embodiment, the award includes the result of the award multiplier 222 (2×) multiplied by the denomination or value of the chip 282.

After an indication of a second symbol 22 in a secondary award group 28 wagered on by a player, the motor 274 causes the rollers 270 and 272 to rotate. The rotation of the rollers 270 and 272 causes the track 276 to move. The movement of the track 276 causes the chip 282 to advance next to a second award multiplier 222. As illustrated in FIG. 15, the second award multiplier 222 has a value of 12×. When the chip 282 advances to the second award multiplier 222, the dealer provides or reserves an award for the player including any wager on the secondary award group 28 modified by the second award multiplier 222 (12×). As long as the player avoids a termination condition, the chip 282 continues to advance to different award multipliers 222 after successive indications of symbols 22 in the secondary award group 28 and the dealer continues to provide awards to a player based on the award multipliers 222.

As the chip 282 advances to different award multipliers 222, the chip 282 moves toward the chip output 266. In one embodiment, when all symbols 22 indicated in the secondary award group 28 (i.e., the chip 282 is advanced to the highest award indicator 222), the chip 282 advances to the chip output 266 and is dumped into the holding bin 286 or router 284. In another embodiment, when a termination event occurs, such as the indication of a symbol 22 not within a secondary award group 216, any chips 282 positioned on the track 276 automatically advance to the chip output 266 and are dumped into the holding bin 286 or router 284.

As illustrated in FIG. 15, the router 284 is positioned adjacent to the chip output 266 to receive the dumped chips. The router 284 is operable to route chips, tokens or betting markers to individual players at respective wagering stations. In one embodiment, the router 284 includes a delivery tube or chute (not shown) or another suitable delivery mechanism associated with each wagering station to effect the routing. Alternatively, the router 284 can route the chips to the dealer. In one embodiment, chips 282 are dumped from the chip output 266 into a holding bin 286 instead of the router 284. In this embodiment, the chips 282 are not returned to the players. In another embodiment, the chips 282 are dumped into the router 284 which directs the chip to the holding bin 286 instead of to one of the wagering stations.

In one embodiment, the rotor 202 is coupled to a bonus device. In one embodiment, the landing of a ball on a bonus landing (not shown) triggers the operation of the bonus device (not shown). In another embodiment, progress within a secondary sequence trigger the operation of the bonus device. Once activated, the bonus device produces or determines one or more bonus outcomes or secondary outcomes. The bonus device also includes at least one visual aid or output device, such as the outcome display 219 illustrated in FIG. 11. The outcome display 219 or another suitable visual output device visually indicates or displays the secondary outcome determined by the bonus device.

It should be appreciated that the bonus device can include any suitable apparatus which is operable to determine a secondary outcome, including, but not limited to, a mechanical outcome generating device, an electro-mechanical outcome generating device, a pseudo-random outcome generating device and a computer. In one embodiment, the bonus device includes a bonus rotor or secondary rotor (not shown) associated with the wheel assembly. In one embodiment, the secondary rotor includes a circular landing section adjacent to a circular symbol section. The landing section includes a series of landings for the ball in play, and the symbol section includes a series of symbols that correspond to the landings. In one example, when a ball lands on a designated landing, such as a bonus landing or a secondary landing, the dealer spins the secondary rotor, and the ball eventually comes to rest in the landing section of the secondary rotor. The landing of the ball on one of the landings on the secondary rotor determines the secondary outcome for the players.

Electronic Embodiments

In one embodiment, some or all of the components, structure, functionality and other elements of the rotor-based game system 10, game 100, gaming device 200 and gaming device 250 described above (collectively referred to as "rotor-based game elements") have a video, simulated, animated or virtual form, where such elements are formed by computerized graphical representations of actual physical objects. In one such embodiment, the rotor-based game elements may be implemented in various configurations for gaming machines or gaming devices, including, but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network, such as the Internet, when the gaming machine or gaming device is in a gaming establishment. In one embodiment, the computerized instructions (i.e., computer readable versions of the rotor-based game elements) are stored in a web server central server, central controller or remote host. In one embodiment, the computerized instructions for controlling any games are executed by the central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 16:
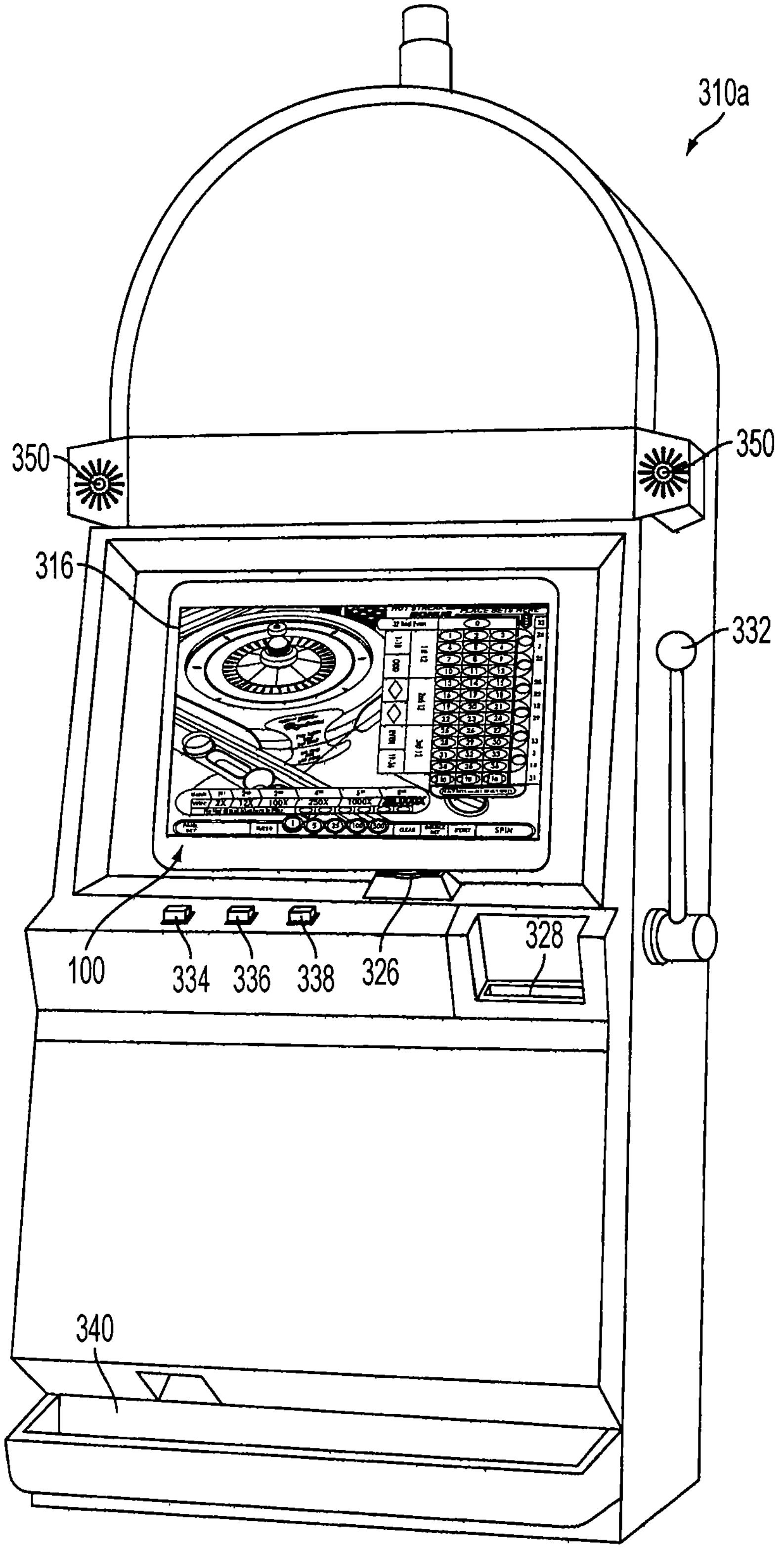
FIG. 16 is a front perspective view of one embodiment of a game system.
Figure 17:
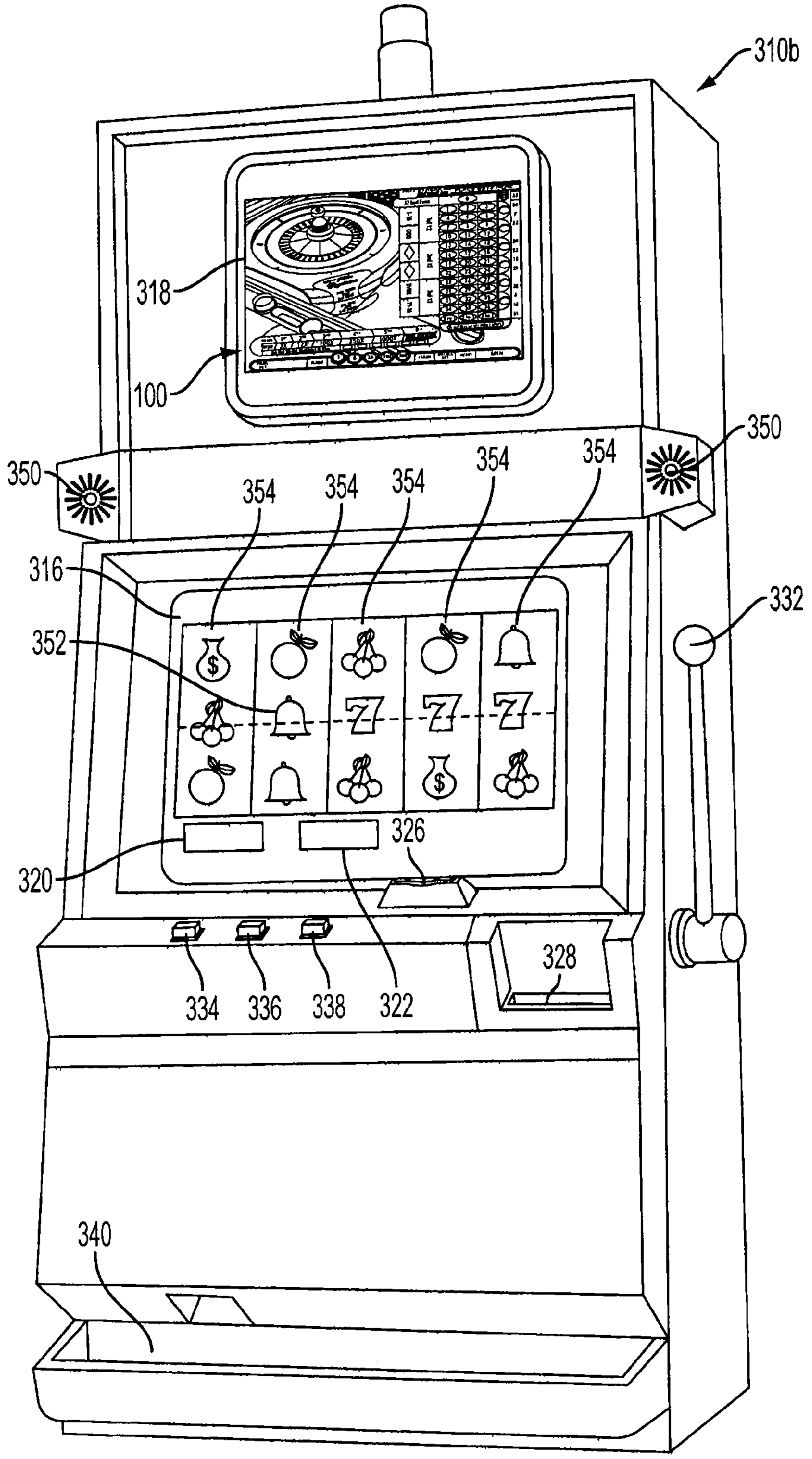
FIG. 17 is a front perspective view of another embodiment of a game system.

Two example alternative embodiments of a gaming device which implements the rotor-based game elements are illustrated in FIGS. 16 and 17 as gaming device 310*a* and gaming device 310*b*, respectively. Gaming device 310*a* and/or gaming device 310*b* are generally referred to herein as gaming device 310.

In the embodiments illustrated in FIGS. 16 and 17, gaming device 310 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 16 and 17, the gaming device may have varying cabinet and display configurations.

Figure 18:
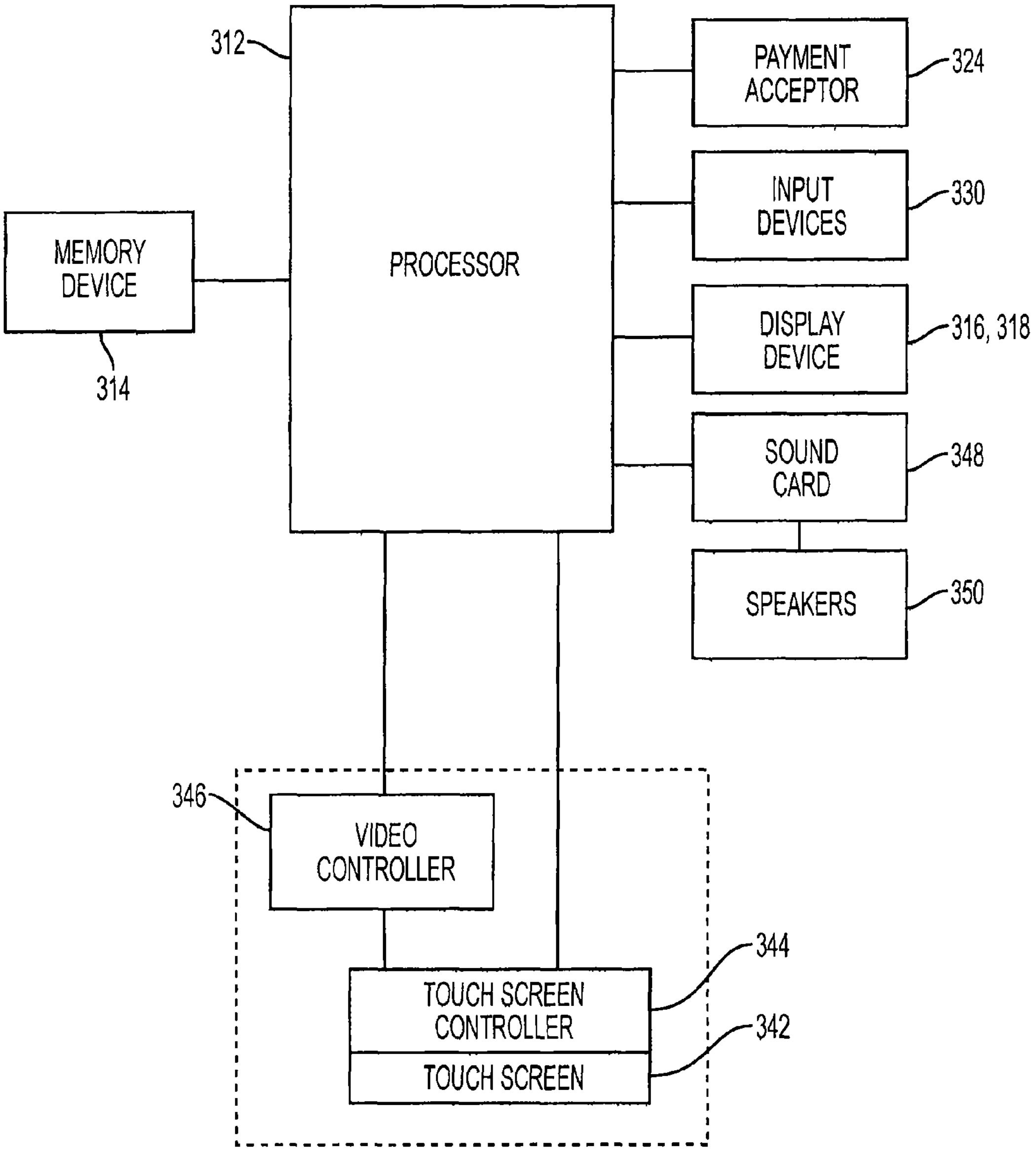
FIG. 18 is a schematic view of another electronic configuration of one embodiment of a game system.

In one embodiment, as illustrated in FIG. 18, the gaming device preferably includes at least one processor 312, such as a microprocessor, a microcontroller-based platform, a suitable integrated circuit or one or more application-specific integrated circuits (ASIC's). The processor is in communication with or operable to access or to exchange signals with at least one data storage or memory device 314. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game logic (including, but not limited to, game logic 14 illustrated in FIG. 1) that relate to the play of the gaming device. In one embodiment, the memory device 314 stores computer-readable instructions and data associated with the functionality of the rotor-based game system 10 described above. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 18, the gaming device includes one or more display devices controlled by the processor. The display devices are preferably connected to or mounted to the cabinet of the gaming device. The embodiment shown in FIG. 16 includes a central display device 316 which displays a primary game. This display device may also display any suitable secondary game associated with the primary game as well as information relating to the primary or secondary game. The alternative embodiment shown in FIG. 17 includes a central display device 316 and an upper display device 318. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 16 and 17, in one embodiment, the gaming device includes a credit display 320 which displays a player's current number of credits, cash, account balance or the equivalent. In one embodiment, gaming device includes a bet display 322 which displays a player's amount wagered.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like. As illustrated in FIGS. 16 and 17, the rotor-based game elements of the rotor-related game 100, as described above, are displayed by one or more display devices of the gaming device.

In another embodiment, the symbols, images and indicia displayed on or of the display device may be in mechanical form as described in further detail above. That is, the display device may include any electromechanical device, such as one or more mechanical objects, such as one or more rotatable wheels, rotors, reels or dice, configured to display at least one or a plurality of game or other suitable images, symbols or indicia.

As illustrated in FIG. 18, in one embodiment, the gaming device includes at least one payment acceptor 324 in communication with the processor. As seen in FIGS. 16 and 17, the payment acceptor may include a coin slot 326 and a payment, note or bill acceptor 328, where the player inserts money, coins or tokens. The player can place coins in the coin slot or paper money, a ticket or voucher into the payment, note or bill acceptor. In other embodiments, devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 16, 17, and 18, in one embodiment the gaming device includes at least one and preferably a plurality of input devices 330 in communication with the processor. The input devices can include any suitable device which enables the player to produce an input signal which is received by the processor. In one embodiment, after appropriate funding of the gaming device, the input device is a game activation device, such as a pull arm 332 or a play button 334 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 16 and 17, one input device is a bet one button 336. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 338. The player may push the cash out button and cash out to receive a cash payment or other suitable form of payment corresponding to the number of remaining credits. In one embodiment, when the player cashes out, the player receives the coins or tokens in a coin payout tray 340. In one embodiment, when the player cashes out, the player may receive other payout mechanisms such as tickets or credit slips redeemable by a cashier (or other suitable redemption system) or funding to the player's electronically recordable identification card.

In one embodiment, as mentioned above and seen in FIG. 18, one input device is a touch-screen 342 coupled with a touch-screen controller 344, or some other touch-sensitive display overlay to allow for player interaction with the images on the display. The touch-screen and the touch-screen controller are connected to a video controller 346. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 18, the gaming device includes a sound generating device controlled by one or more sounds cards 348 which function in conjunction with the processor. In one embodiment, the sound generating device includes at least one and preferably a plurality of speakers 350 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

In addition to incorporating the rotor-based game elements for the rotor-related game 100, gaming device 310 can incorporate any ancillary wagering game. The ancillary wagering game can be incorporated into the game 100 or playable independent of game 100. The gaming machine or device may include some or all of the features of conventional gaming machines or devices. The ancillary game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different wagering games, such as video poker games, video blackjack games, video keno, video bingo or any other suitable game may be implemented.

In one embodiment, as illustrated in FIG. 17, an ancillary wagering game may be a slot game with one or more paylines 352. The paylines may be horizontal, vertical, circular, diagonal, angled or any combination thereof. In this embodiment, the gaming device includes at least one and preferably a plurality of reels 354, such as three to five reels 354, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 354 are in video form, one or more of the display devices, as described above, display the plurality of simulated video reels 354. Each reel 354 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the ancillary wagering game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, the ancillary wagering game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the ancillary wagering game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, the ancillary wagering game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, the game 100 may include a trigger which gives players the opportunity to win credits in an ancillary bonus or secondary game or ancillary bonus or secondary round. The ancillary bonus or secondary game enables the player to obtain a prize or payout in addition to the prize or payout, if any, obtained from the base or primary game 100. In general, the ancillary bonus or secondary game produces a significantly higher level of player excitement than the base or primary game because it provides a greater expectation of winning than the base or primary game and is accompanied with more attractive or unusual features than the base or primary game. In one embodiment, the ancillary bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game. In other embodiments, the triggering event or qualifying condition may be by exceeding a certain amount of game play (such as number of games, number of credits, amount of time), or reaching a specified number of points earned during game play.

In another embodiment, the gaming device processor or central server randomly provides the player one or more plays of one or more ancillary secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play an ancillary secondary game without any explanation or alternatively with simple explanations. In another embodiment, the gaming device (or central server) qualifies a player for an ancillary secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the ancillary bonus game to extend play of the ancillary bonus game.

In one embodiment, no separate entry fee or buy in for an ancillary bonus game need be employed. That is, a player may not purchase an entry into an ancillary bonus game, rather they must win or earn entry through play of the primary game thus, encouraging play of the primary game. In another embodiment, qualification of the ancillary bonus or secondary game is accomplished through a simple "buy in" by the player, for example, if the player has been unsuccessful at qualifying through other specified activities. In another embodiment, the player must make a separate side-wager on the ancillary bonus game or wager a designated amount in the primary game to qualify for the ancillary secondary game. In this embodiment, the ancillary secondary game triggering event must occur and the side-wager (or designated primary game wager amount) must have been placed to trigger the ancillary secondary game.

Figure 19:
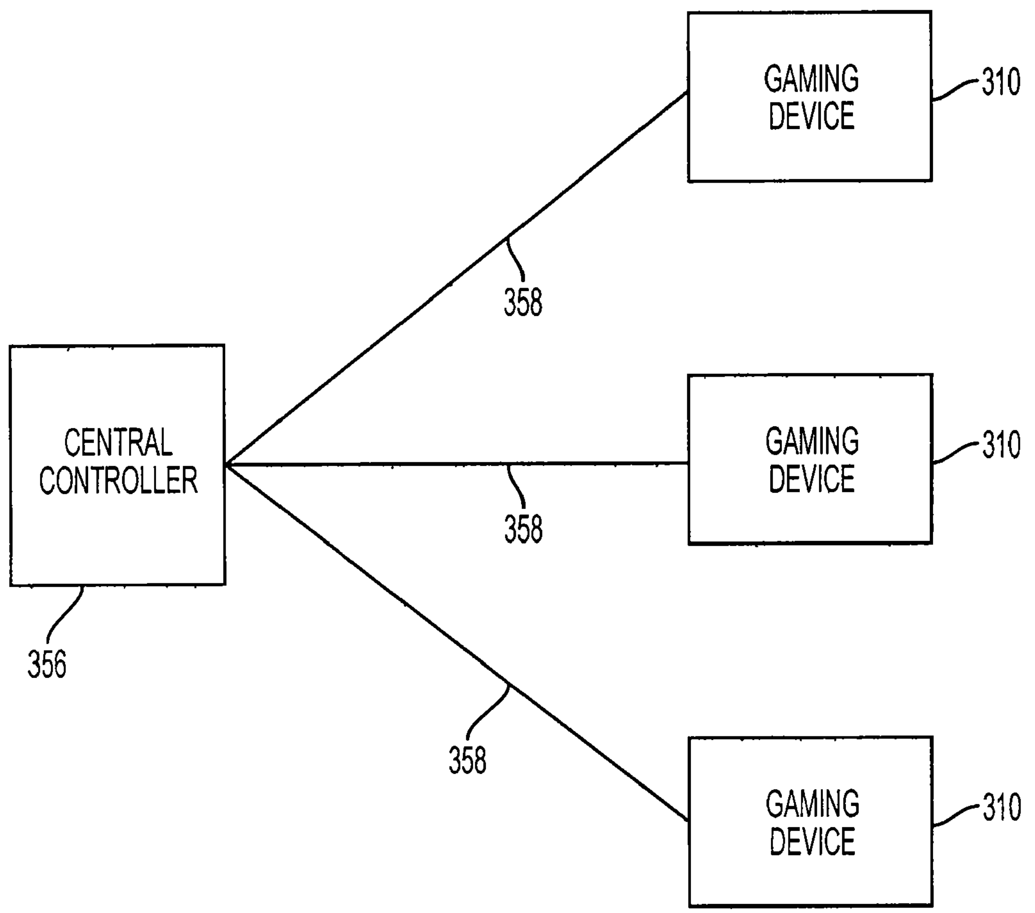
FIG. 19 is a schematic view of a central controller coupled to a plurality of embodiments of the game system.

In one embodiment, as illustrated in FIG. 19, one or more of the gaming devices 310 are in communication with each other and/or at least one central server, central controller or remote host 356 through a data network or remote communication link 358. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome for the wheel related elements of any of the ancillary games described above is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates an ancillary game outcome for the ancillary primary game based on probability data. In another embodiment, the central server or controller randomly generates a game outcome for the secondary game based on probability data. In another embodiment, the central server or controller randomly generates an ancillary game outcome for the primary game, the ancillary secondary game and any ancillary games based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined ancillary game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, an ancillary secondary game outcome, primary, secondary and ancillary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a ball landing on a designated space in a wheel, a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined ancillary game outcome value is determined for each of a plurality of linked or networked gaming devices based on the results of a bingo, keno or lottery game. In this embodiment, each individual gaming device utilizes one or more bingo, keno or lottery games to determine the predetermined ancillary game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary, secondary game or ancillary secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, an ancillary game outcome is determined for each of the enrolled gaming devices based, at least in part, on the selected elements on the provided bingo cards. As described above, the ancillary game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first ancillary game and a second gaming device to have selected elements marked in a different predetermined pattern is provided a second outcome of win $2 which will be provided to a second player regardless of how the second player plays a second ancillary game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined ancillary game outcome may be based on an ancillary award in addition to any award provided for winning the bingo game as described above. In this embodiment, if one or more elements are marked in ancillary patterns within a designated number of drawn elements, an ancillary or intermittent award or value associated with the marked ancillary pattern is provided to the player as part of the predetermined ancillary game outcome. For example, if the four corners of a bingo card are marked within the first twenty selected elements, an ancillary award of $10 is provided to the player as part of the predetermined ancillary game outcome. It should be appreciated that in this embodiment, the player of a gaming device may be provided an ancillary or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the ancillary game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. In this embodiment, the gaming device and/or player tracking system tracks any players gaming activity at the gaming device. In one such embodiment, the gaming device and/or associated player tracking system timely tracks when a player inserts their playing tracking card to begin a gaming session and also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN), such as a portion of the worldwide web, in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the interne/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game, an ancillary game or a combination of such games. In another embodiment, the game program may be executable as an ancillary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. For example, as described above with respect to system 10, the award increasers 30 can be progressive awards based on one or more symbols 22 indicated by the rotor. In other embodiments, the progressive award triggering event or qualifying condition may be by exceeding a certain amount of game play (such as number of ancillary games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

In one embodiment, the game system 10 and/or the gaming device 310 includes any one of the embodiments described above. In another embodiment, the game system 10 and/or the gaming device 310 includes any suitable combination of such embodiments. In a further embodiment, the game system 10 and/or the gaming device 310 includes any suitable combination of one or more portions of such embodiments.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming device comprising:

at least one display device;

at least one input device;

at least one processor; and at least one memory device storing a plurality of instructions which, when executed by the at least one processor, cause the at least one processor to operate with the at least one display device and the at least one input device to:

(a) receive a first secondary wager from a player, each secondary wager being associated with a streak game that is associated with a plurality of consecutive plays of a wagering game, said first secondary wager being in addition to any wagers placed on each said play of the wagering game, wherein:

(i) the wagering game includes a rotor displaying a plurality of different outcomes and a plurality of ball landings positioned adjacent to the outcomes, (ii) the streak game includes a streak having a streak continuation condition, (iii) the streak game includes a secondary award group of the outcomes, and (iv) the streak continuation condition is satisfied when an outcome of a play of the wagering game is one of the outcomes of the secondary award group, (b) for a first play of the wagering game:

(i) determine an outcome of the first play of the wagering game, the outcome of the first play of the wagering game being one of the plurality of different outcomes;

(ii) if the outcome of the first play of the wagering game satisfies the streak continuation condition:

(A) provide a first streak award to the player, the first streak award being based on the first secondary wager; and (B) enable the player to place a second secondary wager associated with the streak game using at least a portion of said first streak award; and (iii) if the outcome of the first play of the wagering game does not satisfy the streak continuation condition, end the streak game; and (c) if the outcome of the first play of the wagering game satisfies the streak continuation condition, for a second consecutive play of the wagering game following the first play of the wagering game:

(i) determine an outcome of the second play of the wagering game, the outcome of the second play of the wagering game being one of the plurality of different outcomes;

(ii) if the outcome of the second play of the wagering game satisfies the streak continuation condition:

(A) provide a second streak award to the player, the second streak award being based on the first secondary wager;

(B) if the player placed the second secondary wager, provide a third streak award to the player, the third streak award being based on the second secondary wager; and (C) enable the player to place a third secondary wager associated with the streak game using at least a portion of the second streak award or the third streak award; and (iii) if the outcome of the second play of the wagering game does not satisfy the streak continuation condition, end the streak game.

2. The gaming device of claim 1, wherein the secondary award group is one of a plurality of secondary award groups of the outcomes that are player selectable.

3. The gaming device of claim 1, wherein, if the outcome of the second play of the wagering game satisfies the streak continuation condition, for a third consecutive play of the wagering game following the second play of the wagering game:

(i) determine an outcome of the third play of the wagering game, the outcome of the third play of the wagering game being one of the plurality of different outcomes;

(ii) if the outcome of the third play of the wagering game satisfies the streak continuation condition:

(A) provide a fourth streak award to the player, the fourth streak award being based on the first secondary wager;

(B) if the player placed the second secondary wager, provide a fifth streak award to the player, the fifth streak award being based on the second secondary wager; and (C) if the player placed the third secondary wager, provide a sixth streak award to the player, the sixth streak award being based on the third secondary wager; and (D) enable the player to place a fourth secondary wager associated with the streak game using at least a portion of the fourth streak award, the fifth streak award, or the sixth streak award; and (iii) if the outcome of the third play of the wagering game does not satisfy the streak continuation condition, end the streak game.

4. The gaming device of claim 3, wherein an amount of the fourth streak award is greater than an amount of the second streak award, which is greater than an amount of the first streak award.

5. The gaming device of claim 1, wherein an amount of the second streak award is greater than an amount of the first streak award.

6. The gaming device of claim 1, wherein the wagering game is a Roulette-related game.

7. A gaming device comprising:

at least one display device;

at least one input device;

at least one processor; and at least one memory device storing a plurality of instructions which, when executed by the at least one processor, cause the at least one processor to operate with the at least one display device and the at least one input device to:

(a) receive a first secondary wager from a player, each secondary wager being associated with a streak game that is associated with a plurality of consecutive plays of a wagering game, said first secondary wager being in addition to any wagers placed on each said play of the wagering game, wherein:

(i) the wagering game includes a rotor displaying a plurality of different outcomes and a plurality of ball landings positioned adjacent to the outcomes, (ii) the streak game includes a streak having a streak continuation condition, (iii) the streak game includes a secondary award group of the outcomes, and (iv) the streak continuation condition is satisfied when an outcome of a play of the wagering game is one of the outcomes of the secondary award group, (b) for a first play of the wagering game:

(i) determine an outcome of the first play of the wagering game, the outcome of the first play of the wagering game being one of the plurality of different outcomes;

(ii) if the outcome of the first play of the wagering game satisfies a termination condition, end the streak game; and (iii) if the outcome of the first play of the wagering game does not satisfy the termination condition, satisfies the streak continuation condition, and satisfies a streak award condition:

(A) provide a first streak award to the player, the first streak award being based on the first secondary wager; and (B) enable the player to place a second secondary wager associated with the streak game using at least a portion of said first streak award; and (c) if the outcome of the first play of the wagering game does not satisfy the termination condition and satisfies the streak continuation condition, for a second play of the wagering game following the first play of the wagering game:

(i) determine an outcome of the second play of the wagering game, the outcome of the second play of the wagering game being one of the plurality of different outcomes;

(ii) if the outcome of the second play of the wagering game satisfies the termination condition, end the streak game; and (iii) if the outcome of the second play of the wagering game does not satisfy the termination condition, satisfies the streak continuation condition, and satisfies the streak award condition:

(A) provide a second streak award to the player, the second streak award being based on the first secondary wager;

(B) if the player placed the second secondary wager, provide a third streak award to the player, the third streak award being based on the second secondary wager; and (C) enable the player to place a third secondary wager associated with the streak game using at least a portion of the second streak award or the third streak award.

8. The gaming device of claim 7, wherein the termination condition is satisfied when at least two plays of the wagering game that are associated with the streak game result in an identical one of the outcomes of the secondary award group of the outcomes.

9. The gaming device of claim 7, wherein the termination condition is satisfied when a designated quantity of plays of the wagering game associated with the streak game each result in outcomes not included in the secondary award group of the outcomes.

10. The gaming device of claim 9, wherein the designated quantity is one.

11. The gaming device of claim 7, wherein the termination condition is satisfied when all of the outcomes of the secondary award group of the outcomes have been obtained in plays of the wagering game associated with the streak game.

12. The gaming device of claim 7, wherein the termination condition is satisfied when a designated quantity of the outcomes of the secondary award group of the outcomes have been obtained in plays of the wagering game associated with the streak game.

13. The gaming device of claim 7, wherein, when two plays of the wagering game associated with the streak game result in an identical one of the outcomes of the secondary award group of the outcomes, the plurality of instructions, when executed by the at least one processor, cause at least one processor to provide the player with a suspension condition, the suspension condition being configured to: (a) suspend any future satisfaction of the termination condition; and (b) satisfy the continuation condition.

14. The gaming device of claim 7, wherein the plurality of instructions, when executed by the at least one processor, cause the at least one processor to, when a suspension condition is satisfied, suspend the satisfaction of the termination condition and satisfy the continuation condition.

15. The gaming device of claim 14, wherein the suspension condition is satisfied when a designated quantity of outcomes outside of the secondary award group of the outcomes have been obtained by a plurality of plays of the wagering game associated with the streak game, said designated quantity being at least one.

16. The gaming device of claim 7, which includes an outcome indication pattern associated with the outcomes, the outcome indication pattern specifying a plurality of consecutive outcomes of the wagering game, at least one of said outcomes being within the secondary award group.

17. The gaming device of claim 16, which includes a pattern tracker.

18. The gaming device of claim 7, wherein the wagering game is a Roulette-related game.

* * * * *

UNITED STATES PATENT AND TRADEMARK OFFICE

CERTIFICATE OF CORRECTION

PATENT NO. : 8,221,214 B2
APPLICATION NO. : 11/609173
DATED : July 17, 2012
INVENTOR(S) : Mark C. Nicely It is certified that error appears in the above-identified patent and that said Letters Patent is hereby corrected as shown below:

IN THE CLAIMS

In Claim 13, Column 44, Line 35, between "the" and "continuation" insert --streak--.
In Claim 14, Column 44, Line 40, between "the" and "continuation" insert --streak--.

Signed and Sealed this
Twenty-fifth Day of December, 2012

David J. Kappos
*Director of the United States Patent and Trademark Office*